United States Patent
McAndrews

(10) Patent No.: US 7,878,310 B2
(45) Date of Patent: *Feb. 1, 2011

(54) BICYCLE DAMPER

(75) Inventor: Michael McAndrews, Capitola, CA (US)

(73) Assignee: Specialized Bicycle Components, Inc., Morgan Hill, CA (US)

(*) Notice: Subject to any disclaimer, the term of this patent is extended or adjusted under 35 U.S.C. 154(b) by 681 days.

This patent is subject to a terminal disclaimer.

(21) Appl. No.: 11/771,818

(22) Filed: Jun. 29, 2007

(65) Prior Publication Data

US 2009/0000885 A1    Jan. 1, 2009

Related U.S. Application Data

(63) Continuation-in-part of application No. 11/500,036, filed on Aug. 7, 2006, now Pat. No. 7,690,666.

(51) Int. Cl.
*F16F 9/34* (2006.01)
(52) U.S. Cl. .................. 188/275; 188/314; 188/318; 188/319.1
(58) Field of Classification Search .............. 188/275, 188/313, 314, 315, 316, 317, 318, 319.1; 280/284, 285, 276
See application file for complete search history.

(56) References Cited

U.S. PATENT DOCUMENTS

| 1,492,328 | A | 4/1924 | Lang |
| 3,127,958 | A | 4/1964 | Szostak |
| 3,892,298 | A | 7/1975 | Blatt |
| 4,126,302 | A | 11/1978 | Curnutt |
| 4,214,737 | A | 7/1980 | Blatt |
| 4,492,290 | A | 1/1985 | Zavodny |
| 4,899,853 | A | 2/1990 | Hummel |
| 5,332,068 | A | 7/1994 | Richardson et al. |
| 5,368,141 | A | 11/1994 | Clarke |
| 5,467,852 | A | 11/1995 | De Kock |
| 5,598,903 | A | 2/1997 | Richardson |
| 5,810,128 | A | 9/1998 | Eriksson et al. |
| 5,823,305 | A | 10/1998 | Richardson et al. |
| 5,833,036 | A | 11/1998 | Gillespie |
| 5,954,167 | A | 9/1999 | Richardson et al. |
| 6,105,987 | A | 8/2000 | Turner |
| 6,119,830 | A | 9/2000 | Richardson et al. |
| 6,135,434 | A | 10/2000 | Marking |
| 6,244,397 | B1 | 6/2001 | Kars |
| 6,267,400 | B1 | 7/2001 | McAndrews |
| 6,334,516 | B1 | 1/2002 | Shirley et al. |

(Continued)

FOREIGN PATENT DOCUMENTS

EP    1 352 822 A2    10/2003

(Continued)

*Primary Examiner*—Robert A Siconolfi
*Assistant Examiner*—Mariano Sy
(74) *Attorney, Agent, or Firm*—Knobbe, Martens, Olson & Bear, LLP

(57) ABSTRACT

A damper including a valve movable between an open position and a closed position to selectively alter the compression damping rate of the shock absorber. The valve may include a groove feature at the location of the openings in the valve shaft which operates to accumulate the flow of hydraulic fluid through the openings and to equalize the pressure exerted by the fluid on the other components of the valve.

11 Claims, 16 Drawing Sheets

U.S. PATENT DOCUMENTS

| | | |
|---|---|---|
| 6,446,771 B1 | 9/2002 | Sintorn et al. |
| 6,581,948 B2 | 6/2003 | Fox |
| 6,604,751 B2 | 8/2003 | Fox |
| 7,128,192 B2 * | 10/2006 | Fox ............................ 188/275 |
| 2003/0213662 A1 | 11/2003 | Fox |
| 2007/0080515 A1 | 4/2007 | McAndrews |
| 2007/0228691 A1 | 10/2007 | Fox |
| 2008/0023935 A1 | 1/2008 | McAndrews |
| 2009/0000886 A1 * | 1/2009 | McAndrews ................ 188/275 |
| 2009/0000887 A1 * | 1/2009 | McAndrews ................ 188/275 |
| 2009/0000888 A1 | 1/2009 | McAndrews |

FOREIGN PATENT DOCUMENTS

| | | |
|---|---|---|
| FR | 557 584 A | 8/1923 |
| WO | WO 93/01426 | 1/1993 |
| WO | WO 98/14718 | 4/1998 |
| WO | WO 98/34044 | 8/1998 |
| WO | WO 2004/079222 | 9/2004 |

* cited by examiner

BICYCLE DAMPER

CROSS-REFERENCE TO RELATED APPLICATIONS

This application is a continuation-in-part of, and claims priority to, U.S. patent application Ser. No. 11/500,036, filed Aug. 7, 2006, now U.S. Pat. No. 7,690,666.

INCORPORATION BY REFERENCE

The entirety of U.S. patent application Ser. No. 11/500, 036, filed Aug. 7, 2006, is expressly incorporated by reference herein and made a part of the present specification.

BACKGROUND OF THE INVENTION

1. Field of the Invention

The present invention generally relates to vehicle suspension systems. More specifically, the present invention relates to an improved shock absorber system to be incorporated into the suspension system of a bicycle.

2. Description of the Related Art

Bicycles intended for off-road use, i.e., mountain bikes, commonly include a suspension assembly operably positioned between the rear wheel of the bicycle and the frame of the bicycle. The suspension assembly typically includes a shock absorber configured to absorb forces imparted to the bicycle by bumps or other irregularities of the surface on which the bicycle is being ridden. However, an undesirable consequence of incorporating a suspension assembly in a bicycle is the tendency for the shock absorber to absorb a portion of the power output of a rider of the bicycle. In some instances, i.e. when the rider is standing, the proportion of power absorbed by the shock absorber may be substantial and may drastically reduce the efficiency of the bicycle.

Vehicle shock absorbers utilize inertia valves to sense rapid accelerations generated from a particular part of the vehicle. Inertia valves are also used to change the rate of damping in the shock absorber depending on the magnitude of the acceleration. As an example, the inertia valve assembly may be arranged to adjust the damping of the rear shock in accordance with accelerations that are generated by the body of the vehicle differently than it would adjust the damping of the rear shock for accelerations that are generated by the rear wheel of the vehicle.

One example of the type of shock absorber that utilizes an inertia valve to distinguish rider-induced forces from terrain-induced forces and is described in U.S. Pat. No. 6,604,751 B2. According to U.S. Pat. No. 6,604,751, the shock absorber of U.S. Pat. No. 6,604,751 is positioned between the swing arm and the main frame to provide resistance to the pivoting motion of the swing arm. The rear shock absorber includes a peripherally located fluid reservoir that is connected to the swing arm at a distance away from the shock body, and is hydraulically connected to the main shock body by a hydraulic hose. In one embodiment, the reservoir of U.S. Pat. No. 6,604,751 is connected to the swing arm portion of the bicycle above the hub axis of the rear wheel.

The inertia valve assembly of U.S. Pat. No. 6,604,751 discloses an inertia valve attempting to overcome the effects of external forces and manufacturing defects that inhibit the motion of the inertia valve with the use of a labyrinth seal having a series of "Bernoulli Steps" on an interior surface of the inertia mass. Also, the peripherally located reservoir of U.S. Pat. No. 6,604,751 discloses a blowoff valve that allows for an increased flow rate after a minimum threshold pressure is exceeded inside the blowoff chamber. Typically, this will occur when the bicycle hits a severe bump. Further, the refill ports and the axial blowoff passages of the shock absorber of U.S. Pat. No. 6,604,751 are located on the top surface of the reservoir.

However, the need exists for an improved, lightweight rear inertia valve shock. The availability of lightweight, high performance inertia valve shocks are critical to competition cyclists, where a reduction of even a few ounces can greatly benefit the cyclist, and significantly impact the desirability of the shock.

SUMMARY OF THE INVENTION

An aspect of one embodiment is a shock absorber for a bicycle comprising a primary unit, a remote unit that is substantially entirely outside of the primary unit, and an inertial valve within the remote unit. The primary unit comprises a damper tube, a spring chamber, and a piston rod that supports a main piston. The main piston is movable within the damper chamber of the primary unit. The main piston and the damper tube at least partially define a compression chamber. The remote unit comprises a remote fluid chamber. The inertial valve is preferably responsive to terrain-induced forces and preferably not responsive to rider-induced forces when the shock absorber is assembled to the bicycle. The shock absorber comprises a flow path separated from the piston rod that connects the remote fluid chamber and the compression chamber of the damper tube.

An aspect of one embodiment is a damper for a bicycle, comprising a primary unit comprising a damper tube, a piston rod that supports a main piston, a reservoir tube that is outside of compression chamber of the primary tube, and an inertia valve within the reservoir tube. The damper also comprises a flow path connecting the reservoir fluid chamber and the compression chamber of the primary tube. The main piston is movable within the damper chamber of the primary unit. The main piston and the damper tube at least partially define a compression chamber and a rebound chamber. The reservoir tube comprises a reservoir fluid chamber. At a piston speed of approximately 4 meters/second, at least 40% of the compression damping in the reservoir tube occurs in a circuit which is not closable by the inertia valve.

An aspect of one embodiment is a damper for a bicycle, comprising a primary unit comprising a damper tube, a piston rod that supports a main piston, a reservoir tube that is outside of the compression chamber of the primary tube, and an inertial valve within the reservoir tube. The damper also comprises a flow path connecting the reservoir fluid chamber and the compression chamber of the primary tube. The damper also comprises a damping valve in the reservoir tube. When the inertia valve is open, the damping valve opens before flow through the inertia valve is maximized. The main piston and the damper tube at least partially define a compression chamber and a rebound chamber. The main piston is movable within the damper chamber of the primary unit. The reservoir tube comprises a reservoir fluid chamber. The inertial valve is responsive to terrain-induced forces and not responsive to rider-induced forces when the shock absorber is assembled to the bicycle.

An aspect of one embodiment is a damper for a bicycle, comprising a primary unit comprising a damper tube, a piston rod that supports a main piston, a reservoir tube that is outside of compression chamber of the primary tube, an inertial valve within the reservoir tube, a flow housing within the reservoir tube, and a flow path connecting the reservoir fluid chamber and the compression chamber of the primary tube. The main piston is movable within the damper chamber of the primary unit. The main piston and the damper tube at least partially define a compression chamber and a rebound chamber. The reservoir tube comprises a reservoir fluid chamber. The flow housing defines a first end and a second end, a first one way valve positioned at the first end, and a second one way valve positioned at the second end. The inertia valve has an open position and a closed position. The inertial valve permits a flow of the fluid from the compression chamber of the primary tube to the reservoir fluid chamber of the reservoir tube when the inertial valve is in the open position and the flow through the inertia valve is reduced when the inertia valve is in the closed position. In one embodiment, the damping valve opens when there is 25 pounds of force on the damping valve.

An aspect of one embodiment is a shock absorber for a bicycle comprising a primary tube comprising a compression chamber and a spring chamber, a piston rod that supports a main piston, a remote tube that is separate from the primary tube, an inertial valve within the remote tube, a flow housing, and a flow path connecting the remote fluid chamber and the compression chamber of the primary tube. The main piston is movable within the compression chamber of the primary tube. The remote tube comprises a remote fluid chamber. The flow housing defines a first end and a second end, a first one way valve positioned at the first end, and a second one way valve positioned at the second end. The inertial valve is responsive to terrain-induced forces and not responsive to rider-induced forces when the shock absorber is assembled to the bicycle. The inertia valve has an open position and a closed position and permits a flow of the fluid from the compression chamber of the primary tube to the remote fluid chamber of the remote tube when the inertial valve is open and the flow through the inertia valve is reduced when the inertia valve is in the closed position.

An aspect of one embodiment is a shock absorber for a bicycle comprising a primary tube comprising a compression chamber and a spring chamber, a piston rod that supports a main piston, a remote tube that is separate from the primary tube, an inertial valve within the remote tube, a shaft within the remote tube defining a plurality of flow ports and an outer annular groove connecting the plurality of flow ports, and a flow path connecting the remote fluid chamber and the compression chamber of the primary tube. The main piston is movable within the compression chamber of the primary tube. The remote tube comprises a remote fluid chamber. The inertial valve is responsive to terrain-induced forces and not responsive to rider-induced forces when the shock absorber is assembled to the bicycle. The inertia valve has an open position and a closed position. The inertial valve permits a flow of the fluid from the compression chamber of the primary tube to the remote fluid chamber of the remote tube when the inertial valve is open and the flow through the inertia valve is reduced when the inertia valve is in the closed position.

An aspect of one embodiment is an inertia valve for a bicycle damper comprising a reservoir shaft defining a first inside surface and an outside surface, a groove formed in the outside surface of the reservoir shaft, a plurality of openings formed in the reservoir shaft between the inside surface and the outside surface, an inertia mass defining a second inside surface that faces the outside surface of the reservoir shaft, and a spring. The inertia valve defines a closed position wherein the second inside surface of the inertia mass substantially completely prevents fluid from flowing through the plurality of openings. The inertia mass also defines an open position wherein the fluid is permitted to flow through any of the plurality of openings. The fluid flowing in an outward direction through any of the plurality of openings flows into the groove. The inertia mass is biased toward the closed position by the spring. The second inside surface of the inertia mass is preferably spaced apart from the outside surface of the reservoir shaft.

BRIEF DESCRIPTION OF THE DRAWINGS

These and other features, aspects and advantages of the present bicycle shock absorber are described below with reference to drawings of preferred embodiments, which are intended to illustrate, but not to limit, the present invention. The drawings contain sixteen (16) figures. Sixteen figures are described herein.

DETAILED DESCRIPTION OF THE PREFERRED EMBODIMENT

Figure 1:
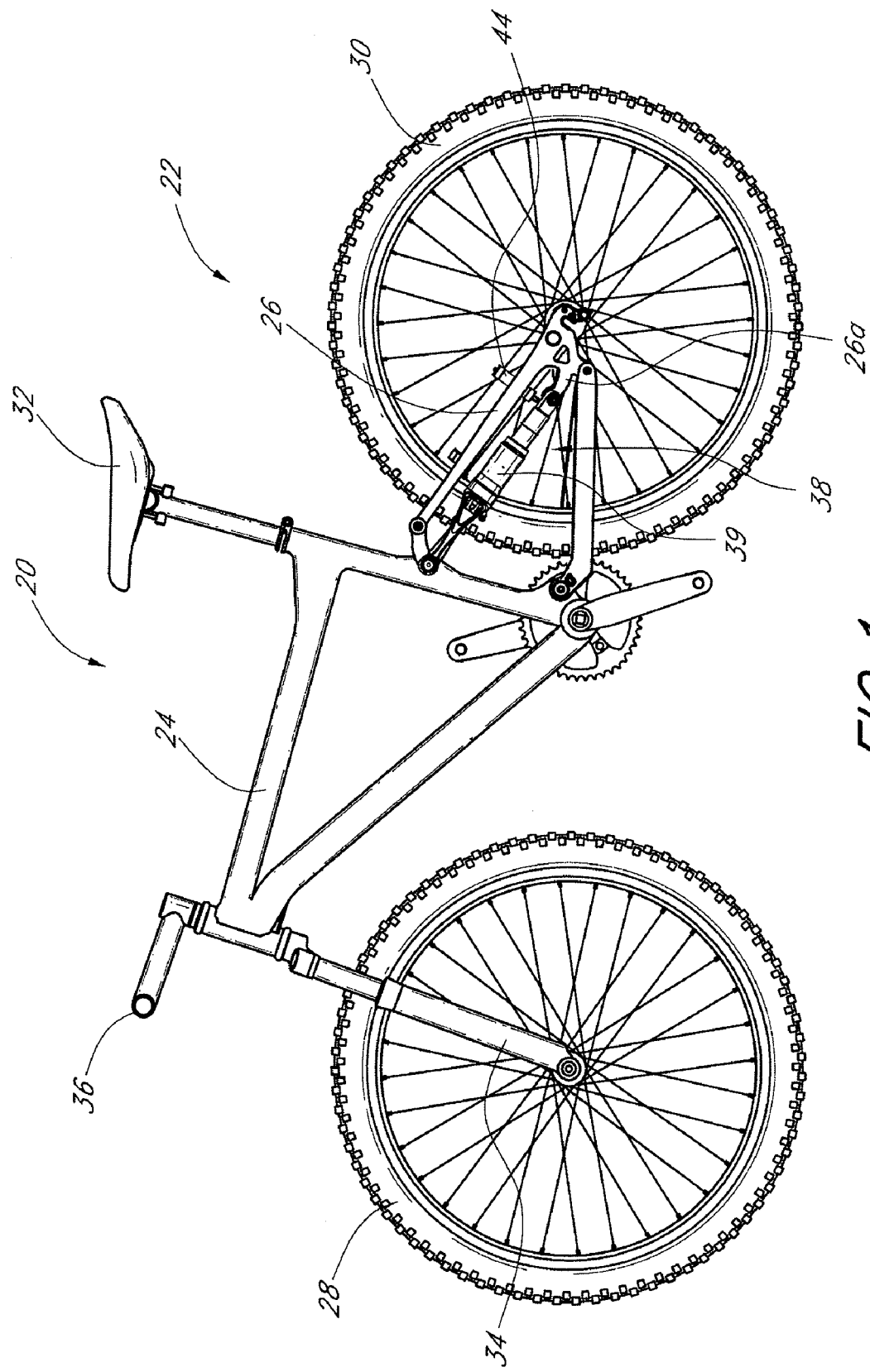
FIG. 1 is a perspective view of a bicycle including a preferred rear shock absorber.

Referring to FIG. 1, a bicycle 20 (e.g., a mountain bike) having a preferred embodiment of a rear suspension assembly, or shock absorber, is illustrated. The bicycle 20 includes a frame 22, preferably comprised of a generally triangular main frame portion 24 and an articulating frame portion, or subframe 26, which is preferably pivotally connected to the seat post tube 25 of the main frame portion 24. The bicycle 20 also includes a front wheel 28 and rear wheel 30. The rear wheel 30 is connected to the subframe portion 26. A seat 32, to provide support to a rider in a sitting position, is connected to the seat post tube 25. It is understood that in some embodiments, main frame portion 24 may not be generally triangular or have a seat tube which extends uninterrupted to the bottom bracket.

Positioned between the subframe 26 and the seat post tube 25 is a preferred embodiment of a rear shock 38. It is noted that, while the shock 38 disclosed herein is described in the context of its use as a rear shock absorber for an off-road bicycle, the applicability of the invention is not so limited. Aspects of the invention can be utilized in bicycle forks.

Figure 2:
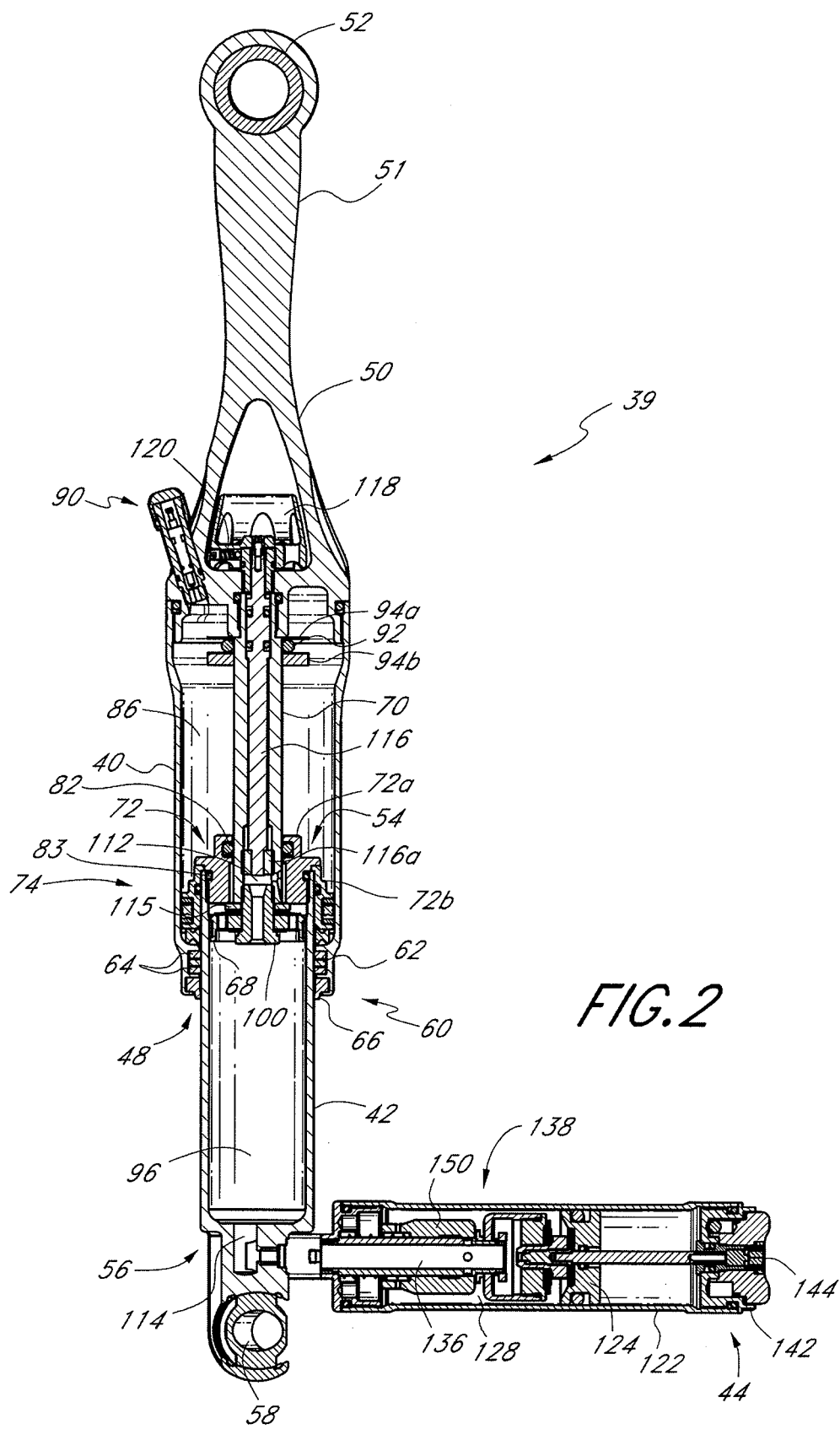
FIG. 2 is a cross-section of the rear shock absorber of FIG. 1.

The rear shock 38 provides resistance to the pivoting motion of the subframe 26, providing a suspension spring and damping to the motion of the subframe 26. Preferably, the spring is an air spring arrangement, but coil springs and other suitable arrangements may also be used. Thus, the bicycle 20 illustrated in FIG. 1 includes a rear shock 38 between the rear wheel 30 and the frame 22. In this configuration, the rear shock 38 substantially reduces the magnitude of the impact forces imparted on the rear wheel 30 by the terrain and felt by the operator of the bicycle. Referring to FIG. 2 the rear shock 38 desirably includes a primary unit or main body portion 39 and a remote unit or secondary or reservoir body portion 44. Note that the reservoir body portion 44 may be located adjacent to, or otherwise remote with respect to, the main body portion. However, in another embodiment, the reservoir body portion may be located within the main body portion. In some embodiments, the fluid reservoir body portion 44 is directly connected to the main body portion 39 external to the main body portion 39.

As is discussed in detail below, the inertia valve described herein may advantageously be configured to be highly responsive to changes in the acceleration of the rear shock 38. Further, in some embodiments, the inertia valve components described herein are relatively easy and cost effective to produce, resulting in low manufacturing costs and few production errors. As discussed, the rear shock 38 preferably includes an inertia valve 138 that varies the damping rate of the rear shock 38 depending upon the direction of an acceleration of the inertia valve 138. In this configuration, the inertia valve 138 can distinguish between forces imparted on the rear wheel 30 originating from the rider of bicycle from forces imparted on the rear wheel 30 by bumps in the path of travel. Performance of the bicycle is improved when forces generated by the rider are more firmly damped and forces imparted on the rear wheel 20 by bumps in the road are damped more softly. This reduces or prevents shock absorber movement resulting from rider-induced forces, such as by pedaling, while allowing the shock absorber to compensate for forces imparted on the rear wheel 20 by uneven terrain. It is understood that in some embodiments, the shock absorber will move very little in response to rider induced pedal forces.

A preferred embodiment of the rear shock 38 is illustrated in FIGS. 2-16. Generally, the rear shock 38 comprises a spring, a main piston assembly, and a reservoir. In one embodiment, the spring comprises an air spring formed by an air tube 40 and a spring piston comprising a seal formed on the exterior of a hydraulic fluid body portion 42. In the illustrated embodiment, reservoir body portion 44 is external to the main body portion 39 but is directly connected to the hydraulic fluid body portion 42 without long external passages, hydraulic hoses, or the like. The connection between the reservoir body portion 44 and the main body of the shock 38 can be achieved by any suitable means, such as by, but not limited to, threading or press-fitting the reservoir body portion 44 into the hydraulic fluid body portion 42. Alternatively, the reservoir body portion 44 can be monolithically formed with the hydraulic fluid body portion 42.

Figure 3:
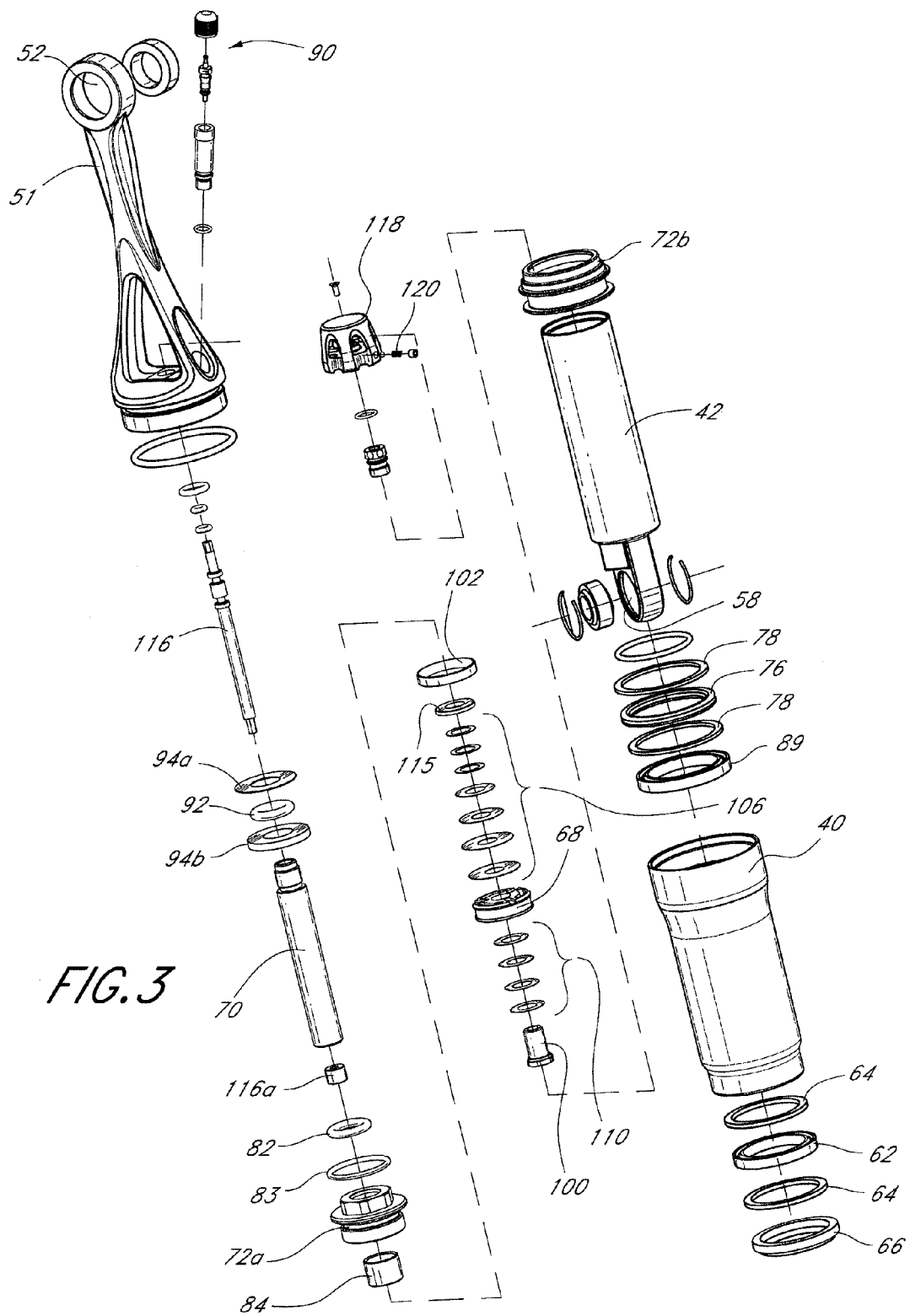
FIG. 3 is an exploded perspective view of the components of the rear shock absorber of FIG. 1.

FIG. 3 is an exploded perspective view of the components that comprise the main body portion 39 of the rear shock 38. Preferably, the main body portion 39 is generally comprised of a main piston or hydraulic fluid body portion 42, a spring or air tube 40 closed by an upper cap 50, a piston 68, and a hydraulic fluid body portion cap 72. The hydraulic fluid body portion 42 may be cylindrical in shape and includes an open end portion 54 and a lower closed end portion 56. The lower closed end portion 56 has a lower eyelet 58 that is used for connecting the shock 38 to the subframe portion 26 of the bicycle 20 of FIG. 1.

FIG. 1 illustrates an embodiment of the rear shock 38 mounted in its preferred configuration to the main frame portion 24 (using upper eyelet 52) and the subframe portion 26 (using lower eyelet 58) of the bicycle 20. With reference to FIGS. 1 and 3, it can be seen that the mounting planes of the upper eyelet 52 and the lower eyelet 58, respectively, are not coplanar. The mounting plane of the lower eyelet 58 is clocked at a different orientation with respect to the mounting plane of the upper eyelet 52 because, as illustrated in FIG. 1, the subframe mounting tab 26a is positioned at a different orientation as compared to the mounting plane on the main frame portion 24. However, while the orientation of the mounting plane of the lower eyelet 58 is not coplanar with the orientation of the mounting plane of the upper eyelet 52 in the embodiment illustrated in FIGS. 1-3, the respective orientations of the eyelets 52, 58 is not so limited. The mounting planes of the eyelet 52, 58 can be clocked at any orientation suitable for the frame to which the rear shock 38 is mounted.

The air tube 40 may also be cylindrical in shape. The air tube 40 includes an open end 48. The opposite end is closed by an upper cap 50. The upper cap 50 of the air tube 40 has an elongated portion 51 and an upper eyelet 52. The upper eyelet 52 is used to connect the rear shock 38 to the seat post tube 25 of the bicycle 20. The open end 48 of the air tube 40 slidingly receives the hydraulic fluid body portion 42. In this configuration, the air tube 40 and the hydraulic fluid body portion 42 are configured for telescopic movement between the main frame portion 24 and the subframe portion 26 of the bicycle 20.

In another embodiment, the orientation of the rear shock 38 may be changed such that the hydraulic fluid body portion 42 is attached to the seat post tube 25 (at the lower eyelet 58) while the air tube 40 is attached to the subframe 26 (at the upper eyelet 52). However, this is not preferred.

The air tube 40 has a seal assembly 60 positioned at the open end 48 thereof, forming a substantially airtight seal between the hydraulic fluid body portion 42 and the air tube 40. In the illustrated embodiment, the seal assembly 60 is comprised of an annular seal body seal 62 having a substantially square cross-section that is located between a pair of bearings 64. A wiper 66 is located adjacent the open end 48 of the air tube 40 to prevent dust, dirt, rocks, and other potentially damaging debris from entering into the air tube 40 as the hydraulic fluid body portion 42 moves into the air tube 40. A piston member 68 is positioned within and slides relative to the inner surface of the hydraulic fluid body portion 42. The piston member 68 is connected to the upper cap 50 by a shock shaft 70, fixing the piston member 68 for motion within the air tube 40.

Figure 4:
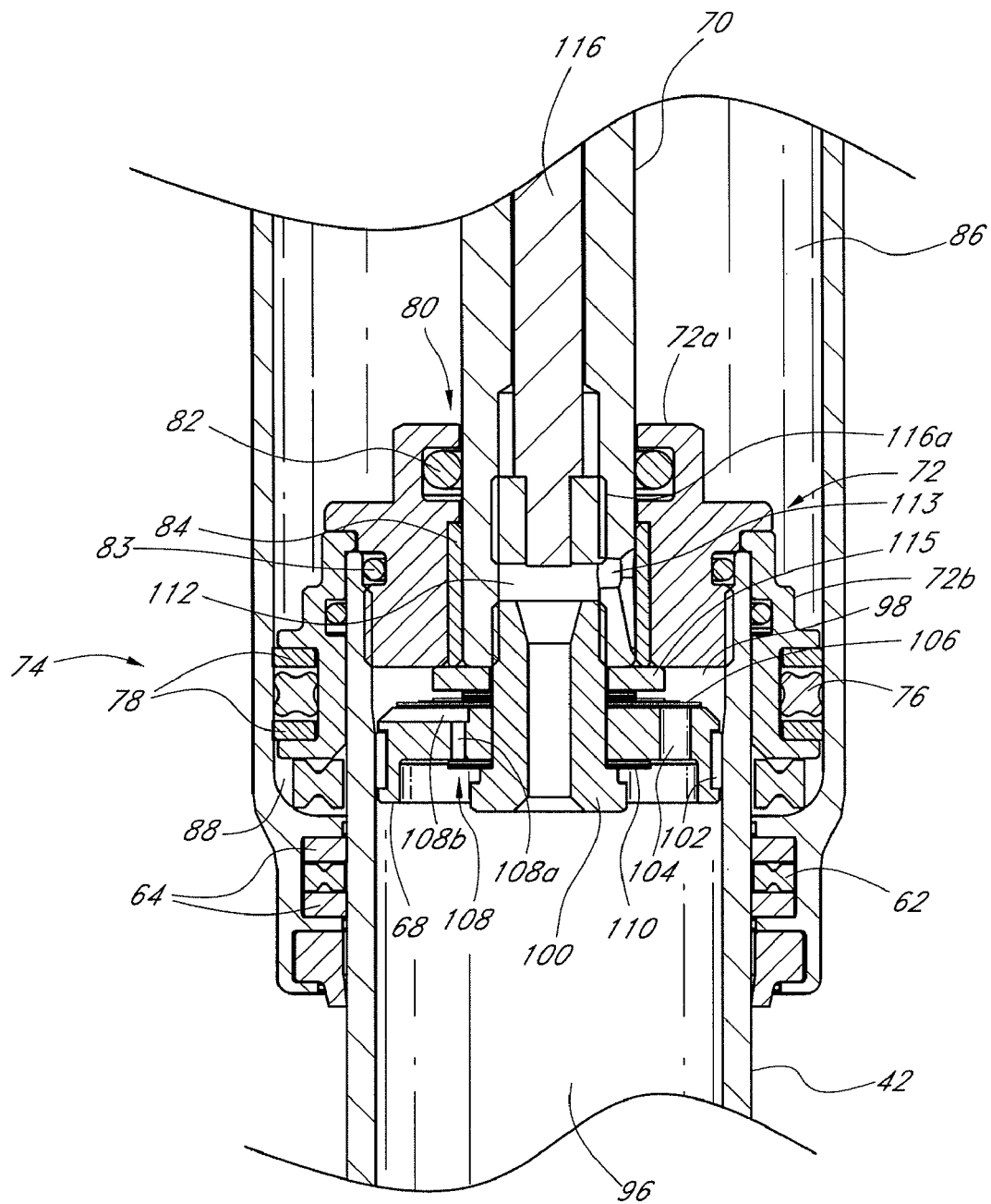
FIG. 4 is an enlarged cross-section of a main portion of the shock absorber of FIG. 2, showing the piston in an uncompressed position.

As most clearly illustrated in FIG. 4, a hydraulic fluid body portion cap 72 is fixed to the open end portion 54 of the hydraulic fluid body portion 42 and is configured to allow the shock shaft 70 to slide within a central opening in the hydraulic fluid body portion cap 72. The hydraulic fluid body portion cap 72 accordingly slides within the inner surface of the air tube 40. Because the hydraulic fluid body portion cap 72 is easier to manufacture in two portions, the hydraulic fluid body portion cap 72 is preferably comprised of an upper cap portion 72a and a lower cap portion 72b. After the lower cap portion 72b is inserted over the end of the hydraulic fluid body portion 42, the upper cap portion 72a is preferably fixed to the hydraulic fluid body portion 42 by threading the upper cap portion 72a into threads formed on the inside surface of the hydraulic fluid body portion 42. The upper cap portion 72a and lower cap portion 72b are configured such that, when the upper cap portion 72a is attached to the hydraulic fluid body portion 42 as described above, the lower cap portion 72b will also be firmly attached to the hydraulic fluid body portion 42. Annular seals 82, 83 are preferably used to prevent hydraulic oil from leaking into the primary air chamber 86 and, similarly, to prevent the gas located in the primary air chamber 86 from leaking into the compression chamber 96.

A seal assembly 74 is preferably positioned on the hydraulic fluid body portion cap 72. The seal assembly 74 is preferably comprised of a seal member 76, which is preferably an annular seal having a substantially round cross-section and is positioned between a pair of bearings 78, and a bushing 84. Together, the seal member 76 and the bushing 84 create a seal between the hydraulic fluid body portion cap 72 and the shock shaft 70, while allowing the shock shaft 70 to translate within the hydraulic fluid body portion cap 72. Note that the cross-section of the seal member 76 may be any suitable shape, such as square or rectangular.

A bottom out bumper 92 is desirably positioned near the closed end portion 50 of the air tube 40 to prevent direct metal to metal contact between the closed end portion 50 and the hydraulic fluid body portion cap 72 of the hydraulic fluid body portion 42 upon full compression of the rear shock 38. The bottom out bumper 92 is preferably formed from a soft, pliable, and resilient material, such as rubber. The bottom out bumper 92 is positioned between two washers 94a, 94b, which hold the bottom out bumper 92 in position next to the closed end portion 50. Washers 94a, 94b can also be formed from a soft, pliable, and resilient material, such as rubber. Similarly, an annular rebound bumper 89 is preferably positioned around the outside of the hydraulic fluid body portion 42 below the hydraulic fluid body portion cap 72, but above the bearings 64. The rebound bumper 89 prevents metal to metal contact between the bottom portion of the hydraulic fluid body portion cap 72 and the constricted portion of the air tube 40, and buffers the magnitude of the impact between the two components, at the end of the rebound motion of the rear shock 38.

The space between the hydraulic fluid body portion cap 72 and the seal assembly 60 defines a second air chamber 88. Air chamber 88 is most clearly illustrated in FIG. 5, which illustrates the main body of the rear shock 38 in a partially compressed state. Air that fills the second air chamber 88 exerts a pressure that resists the rebound motion of the rear shock 38. Rebound motion is defined as the motion of the rear shock 38 that occurs when the shock 38 extends axially such that the closed ends 56 and 50 of the hydraulic fluid body portion 42 move away from each other. In conjunction, the primary air chamber 86 and the second air chamber 88 form the suspension spring portion of the rear shock 38. An air valve 90 (see FIGS. 2-3) communicates with the primary air chamber 86 to allow the air pressure therein to be adjusted. In this manner, the spring rate of the rear shock 38 may be easily adjusted.

The primary air chamber 86 is defined as the space between the closed end portion 50 of the air tube 40 and the hydraulic fluid body portion cap 72. Air held within the primary air chamber 86 exerts a biasing force to resist compression motion of the rear shock 38. Compression motion is defined as the motion of the rear shock 38 that occurs when the closed ends 56 and 50 of the hydraulic fluid body portion 42 and air tube 40 (and thus the eyelets 52, 58) move closer to one another.

Figure 5:
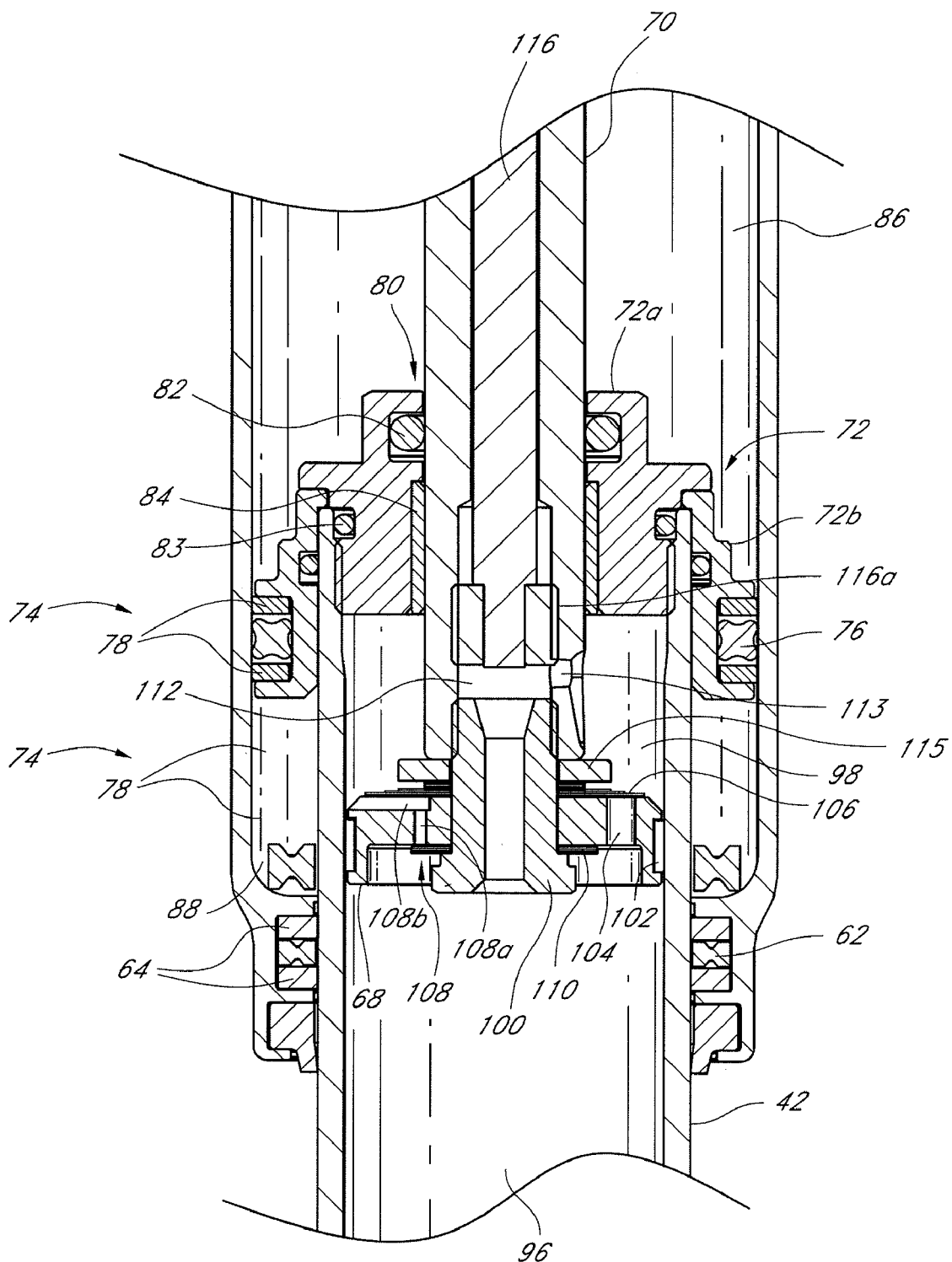
FIG. 5 is an enlarged cross-section of a main portion of the shock absorber of FIG. 2, showing the piston in a partially compressed position.
Figure 8:
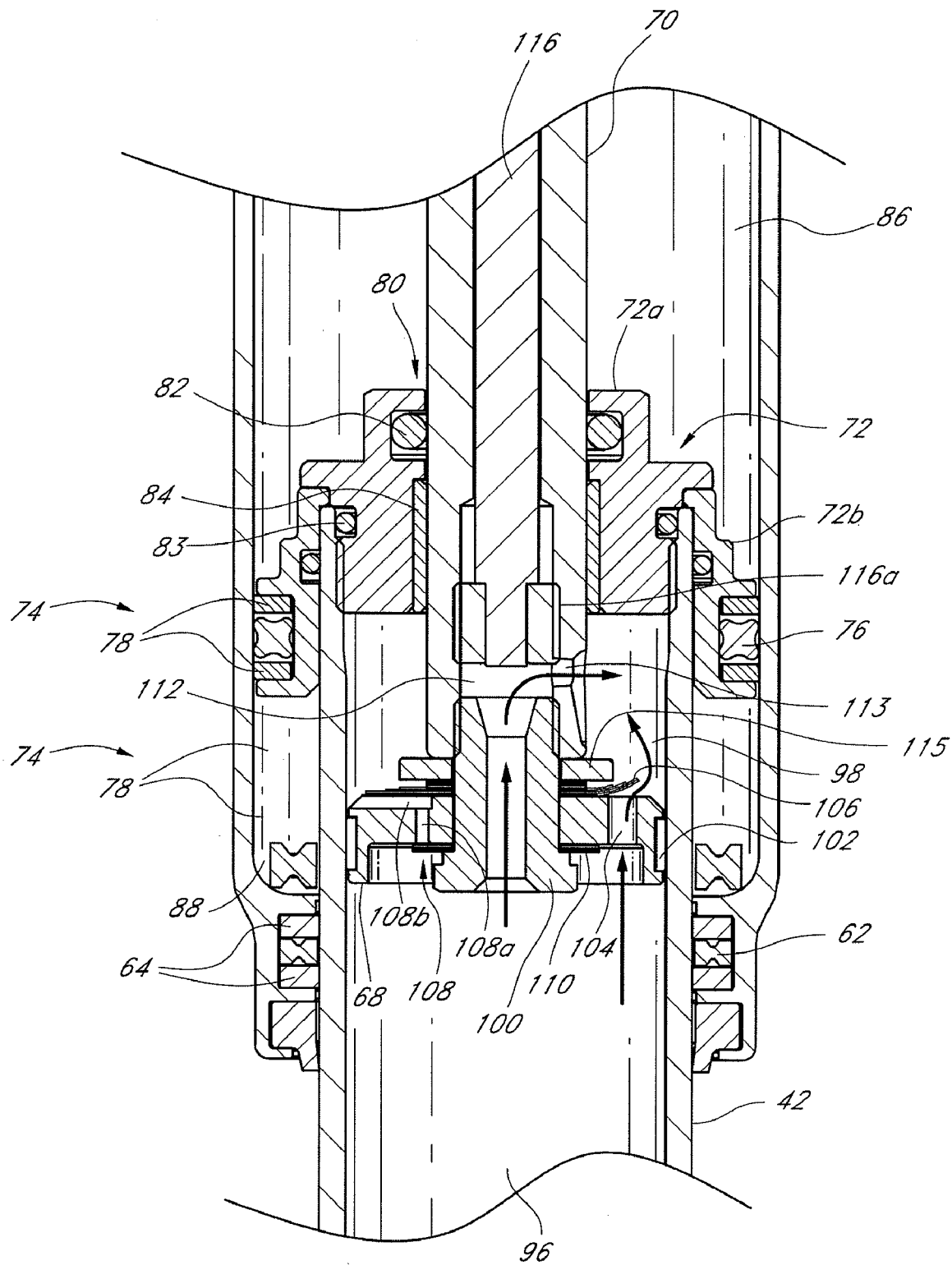
FIG. 8 is an enlarged cross-section of a main portion of the shock absorber of FIG. 1, showing the flow path of hydraulic fluid through the piston during the compression motion of the rear shock.
Figure 9:
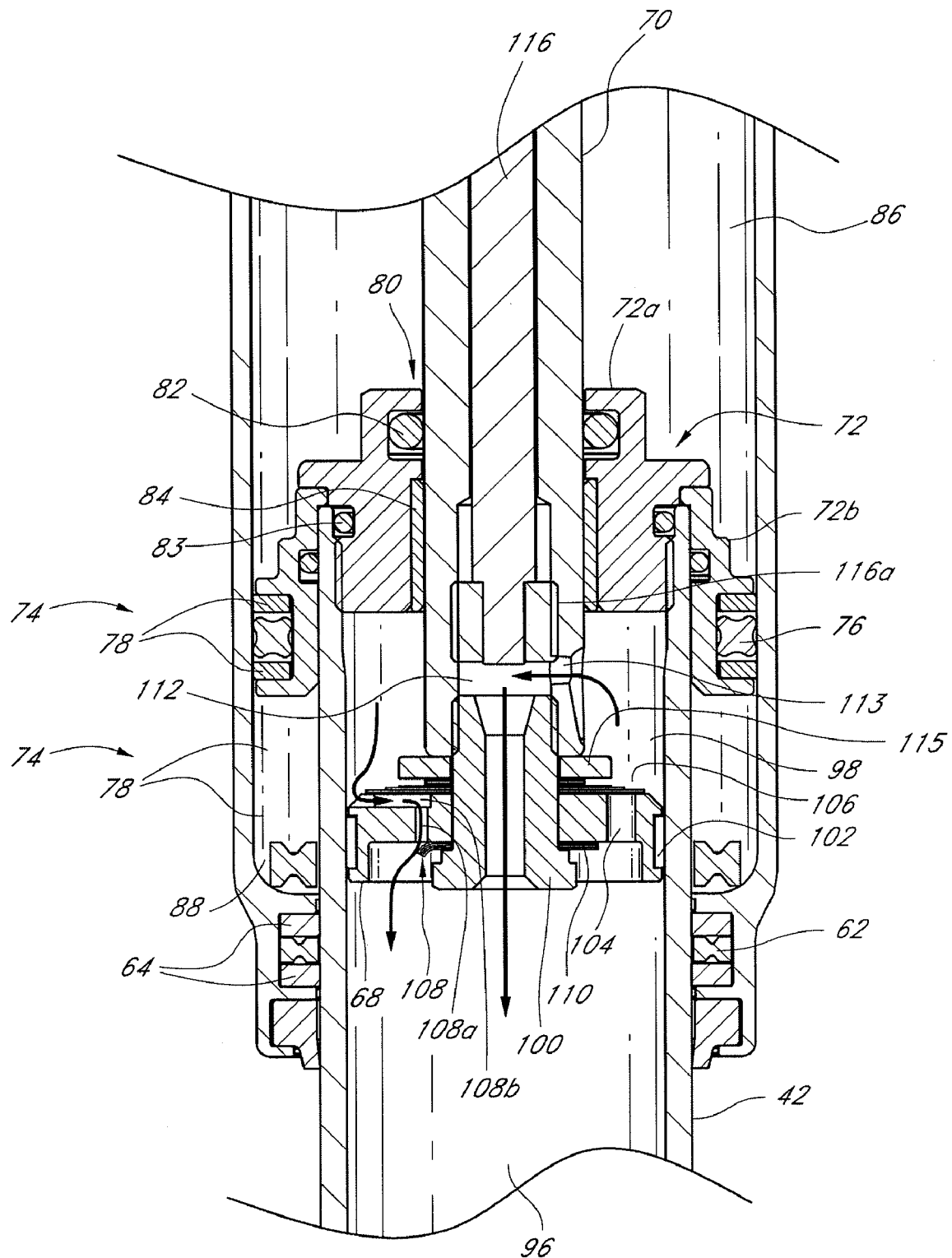
FIG. 9 is an enlarged cross-section of a main portion of the shock absorber of FIG. 1, showing the flow path of hydraulic fluid through the piston during the rebound motion of the rear shock.

The hydraulic fluid body portion 42 of the rear shock 38 will now be described in detail. The interior chamber of the hydraulic fluid body portion 42 is divided by the piston member 68 into two portions. The first portion is the compression chamber 96. The second portion is the rebound chamber 98. The rebound chamber 98 is defined to be the space between the piston member 68 and the hydraulic fluid body portion cap 72. The rebound chamber 98 increases in volume during the compression motion of the rear shock 38, and decreases in volume during the rebound motion of the rear shock 38. The compression chamber 96 is defined as the space between the piston member 68 and the closed end portion 56 of the hydraulic fluid body portion 42. The compression chamber 96 decreases in volume during compression motion of the rear shock 38, and decreases in volume during the rebound motion of the rear shock 38. As is stated above, FIG. 4 illustrates an embodiment of the rear shock 38 wherein the piston 68 is in an uncompressed state. FIGS. 5, 8, and 9 illustrate an embodiment of the rear shock 38 wherein the piston 68 is in a partially compressed state.

As most clearly seen in FIG. 4, a hollow threaded fastener 100 fixes the piston member 68 to the shock shaft 70. A seal 102, of an annular type having a rectangular cross-section, is attached to the piston member 68 and seals the piston 68 with the inner surface of the hydraulic fluid body portion 42.

In the illustrated embodiment, the piston member 68 preferably includes a plurality of compression flow passages 104, each compression flow passage 104 preferably having an elongated shape. The plurality of compression flow passages 104 are most clearly seen in FIGS. 6 and 7. In various embodiments, the compression flow passages 104 may cumulatively perforate and, hence, allow the passage of hydraulic fluid through 10% to 60%, 15% to 40%, or 20% to 35% of included cross-sectional area of the piston 68. As used herein, "included cross-sectional area" means the cross-sectional within the periphery of the piston member 68 in a plane perpendicular to the axis. In the case of the piston member 68, the axis is aligned with the shock shaft 68). The compression flow passages 104 may cumulatively perforate and allow the passage of hydraulic fluid through at least 10%, 15%, 20%, 25%, 30%, 35%, 40%, 45%, 50%, 55% and 60% of the included cross-sectional area.

The compression flow passages 104 are covered on the rebound chamber 98 side of the piston member 68 by a shim stack 106. The shim stack 106 can be made up of one or more flexible, preferably annular, shims. The shim stack 106 preferably operates as a one-way check valve—deflecting to allow a flow path of minimal restriction through the compression flow passages 104 during compression motion of the rear shock 38, while preventing flow through the compression flow passages 104 during the rebound motion of the rear shock 38. In the illustrate configuration, the shim stack 106 is preferably made up of multiple shims having a range of thicknesses, stiffnesses, and diameters that are preferably easily deflected to allow hydraulic fluid to flow with minimal restriction through compression flow passages 104 during compression motion of the rear shock 38. The substantially unrestricted flow path of hydraulic fluid (represented by arrows) through the compression flow passages 104 and the deflection of the shim stack 106 during the compression motion of the rear shock 38 are illustrated in FIG. 8. FIG. 8 also illustrates the flow of hydraulic fluid out of the secondary passage 113 into the rebound chamber 98. For this flow path, the hydraulic fluid flows from the compression chamber 96 through the hollow pin 100 and the central passage 112 before flowing out of the secondary passage 113 and into the rebound chamber 98.

Figure 6:
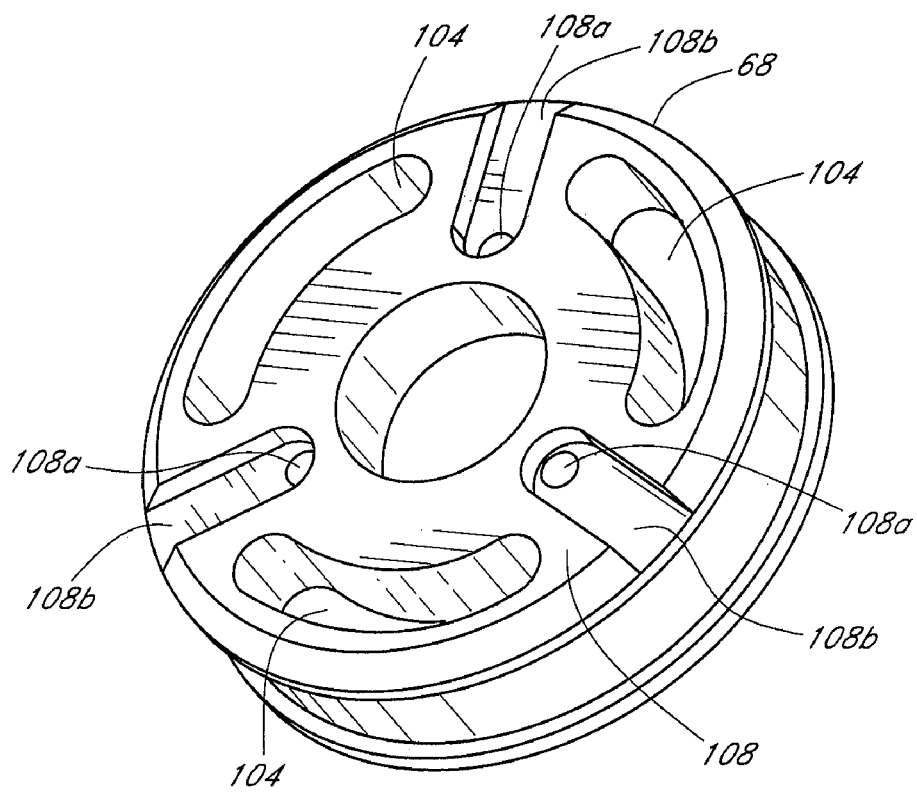
FIG. 6 is perspective view of the rebound side of a preferred piston component of the rear shock absorber of FIG. 1.
Figure 7:
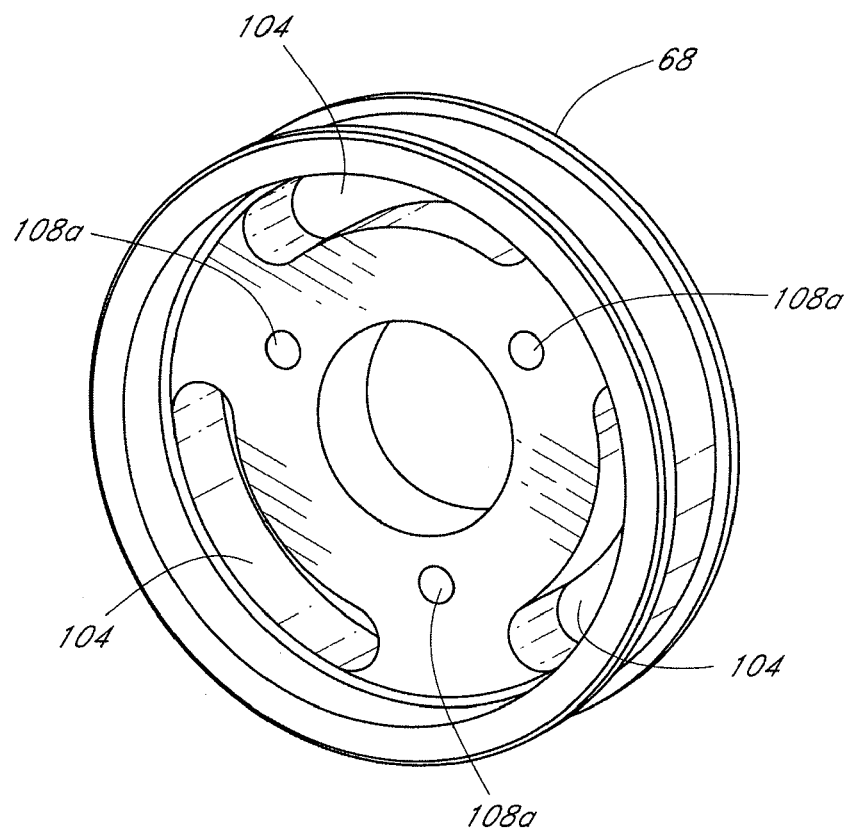
FIG. 7 is perspective view of the compression side of a preferred piston component of the rear shock absorber of FIG. 1.

As most clearly seen in FIGS. 6 and 7, the piston member 68 shown in the illustrated embodiment also comprises a plurality of rebound flow passages 108, preferably three, through the piston member 68. The rebound flow passages 108 preferably have axial through holes 108a and planar channels 108b. The planar channels 108b are formed on the rebound side of the piston member 68 and permit fluid to bypass the compression shim stack 106 during the rebound motion of the rear shock 38. As such, the hydraulic oil flows through both the planar channels 108b and the axial through holes 108a during the rebound motion of the rear shock 38. A notable advantage of this configuration is that the size of the compression flow passages 104 can be increased to permit a very high flow rate of hydraulic fluid through the piston 68 during the compression motion without otherwise limiting the size of the, and, hence, the amount of fluid that can flow through the rebound flow passages 108 that may otherwise be required if the planar channels 108b were not present. This also permits the piston member 68 to be formed from a single piece of material, instead of a multi-piece or cup design.

In certain embodiments, the rebound flow passages 108 may cumulatively perforate and, hence, allow the passage of hydraulic fluid through 2% to 25%, 5% to 15% to 5% to 10% of the included cross-sectional area. The rebound flow passages 108 may cumulatively perforate and, hence, allow the passage of hydraulic fluid through no more than 2%, 5%, 10% or 15% of the included cross-sectional area.

A rebound shim stack 110, which can be made up of one or more flexible shims, is preferably positioned on the compression side of the piston member 68 adjacent to the planar channels 108b. The rebound shim stack 110 deflects to allow, but to control the amount of, flow through the rebound flow passages 108 during the rebound motion of the rear shock 38. The rebound shim stack 110 prevents flow through the rebound flow passages 108 during the compression motion of the rear shock 38, but is preferably configured to not obstruct the flow of hydraulic oil through the more outwardly located compression flow passages 104 during compression motion. As such, the rebound shim stack 110 provides damping to the flow of hydraulic fluid through the piston 68 during the rebound motion of the rear shock 38.

FIG. 9 illustrates the damped flow path of hydraulic fluid (represented by arrows) from the rebound chamber 98 through the rebound flow passages 108, as well as the deflection of the shim stack 110, during the rebound motion of the rear shock 38. FIG. 9 also illustrates the flow of hydraulic fluid from the rebound chamber 98, through the secondary passage 113, the central passage 112, and the hollow pin 100 into the compression chamber 96.

The shock shaft 70 defines a central passage 112 therethrough. The central passage 112 is in communication with the compression chamber 96 through the hollow pin 100. The interior chamber of the reservoir body portion 44 also communicates with the compression chamber 96 through a passage 114 that goes through the closed end portion 56 of the hydraulic fluid body portion 42 of the main body portion 39. This permits hydraulic fluid to flow between the reservoir body portion 44 and the compression chamber 96.

As seen most clearly in FIGS. 8 and 9, a secondary passage 113 through the shock shaft 70 provides a port through which hydraulic fluid may flow between the central passage 112 and the compression chamber 96 when the shock is partially to fully compressed. When the rear shock 38 is in its substantially uncompressed state, as illustrated in FIG. 4, the bushing 84 and plate 115 substantially prevent the hydraulic fluid from flowing through the secondary passage 113 into the rebound chamber 98.

An adjustment rod 116 is positioned concentrically within the central passage 112 of the shock shaft 70, extending from the closed end portion 50 of the air tube 40. The adjustment rod 116 is preferably configured to alter the damping force in the rear shock 38 by altering the amount of fluid that can flow through the secondary passage 113 upon compression motion and rebound motion. This is achieved by adjusting the adjustment rod 116 such that the annular ring 116a partially or fully blocks the secondary passage 113, thus partially or fully preventing fluid from flowing through the secondary passage 113. However, because in the configuration of the main body portion 39 illustrated in FIGS. 2-9, the compression flow passages 104 allow significantly more flow volume therethrough as compared to the rebound flow passages 108, the additional volume of fluid that is permitted to flow through secondary passage 113 more significantly affects the rebound motion than the compression motion of the rear shock 38.

Thus, while adjustment of the adjustment rod 116 alters fluid flow from the compression chamber 96 to the rebound chamber 98 during both compression motion and rebound motion, the adjustment rod 116 more significantly adjusts the fluid flow from the compression chamber 96 to the rebound chamber 98 during the rebound motion of the rear shock 38. The rebound damping, as compared to the compression damping, is more greatly affected by the adjustment of the adjustment rod 116 for the following reason. Barring from consideration the flow restriction provided by the various shim stacks, as discussed above, the compression flow passages 104 are desirably configured to allow a greater flow rate therethrough as compared to the rebound flow passages 108. This is because, as discussed above, the cumulative size of the openings comprising the compression flow passages 104 is desirably significantly greater than the cumulative size of the openings comprising the rebound flow passages 108.

Further, the size of the opening comprising the secondary passage 113 is preferably much less than the cumulative size of the openings comprising the compression flow passages 104. In certain embodiments, the size of the opening comprising the secondary passage 113 can be 2% to 30%, 5% to 25%, 10% to 20% of the cumulative cross-sectional area of the openings comprising the compression flow passages 104. In certain embodiments, the size of the opening comprising the secondary passage 113 no more than 30%, 25%, 15%, 10%, 5% of the cumulative cross-sectional area of the openings comprising the compression flow passages 104. Thus, the additional flow through the secondary passage 113 does not significantly increase the flow from the compression chamber 96 to the rebound chamber 98 during the compression motion of the rear shock 38.

Similarly, the size of the opening comprising the secondary passage 113 is preferably less than the cumulative cross-sectional area of the openings comprising the rebound flow passages 108. In certain embodiments, the cross-sectional area of the opening comprising the secondary passage 113 can be approximately 15% to approximately 35% of the cumulative cross-sectional area of the openings comprising the rebound flow passages 108. In certain embodiments, the cross-sectional area of the opening comprising the secondary passage 113 is no more than 25% of the cumulative cross-sectional area of the openings comprising the rebound flow passages 108. In sum, because the ratio of the size of the secondary passage 113 to the size of the openings comprising the rebound flow passages 108 is greater than the ratio of the size of the secondary passage 113 to the size of the openings comprising the compression flow passages 104, allowing flow through the secondary passage 113 will more significantly affect the net overall flow during the rebound motion of the rear shock 38 as compared to the compression motion of the rear shock 38. Therefore, adjustments to the adjustment rod 116 will preferably have a greater effect on rebound damping as compared to compression damping of the rear shock 38.

As such, the adjustment rod 116 provides the user of the rear shock 38 with the ability to adjust the rebound damping of the rear shock 38. An adjustment dial 118, which is attached to the end of the rebound adjustment rod 116, allows a user to adjust the adjustment rod 116 and, hence, the rebound damping rate of the rear shock 38. The adjustment dial 118 is located on the outside of the rear shock 38. Thus, it is easily accessible by the user. A ball detent mechanism 120 provides distinct adjustment positions of the adjustment dial 118.

It is noted that, while the central passage 112 may be described as having a secondary passage 113, the annular ring 116a of the adjustment rod 116 desirably does not completely prevent flow through the secondary passage 113 even in the fully blocked or closed position. That is, a fluid-tight seal is not typically created between the annular ring 116a of the adjustment rod 116 and the secondary passage 113 even in the fully blocked or closed position. Thus, some fluid may flow through the secondary passage 113 in its closed position. Such fluid flow is often referred to as "bleed flow" and, preferably, is limited to a relatively small flow rate. To create a fluid-tight seal between the above-referenced components would require precise dimensional tolerances, which would be expensive to manufacture, and may also inhibit movement of the adjustment rod 116 in the central passage 112.

Figure 10:
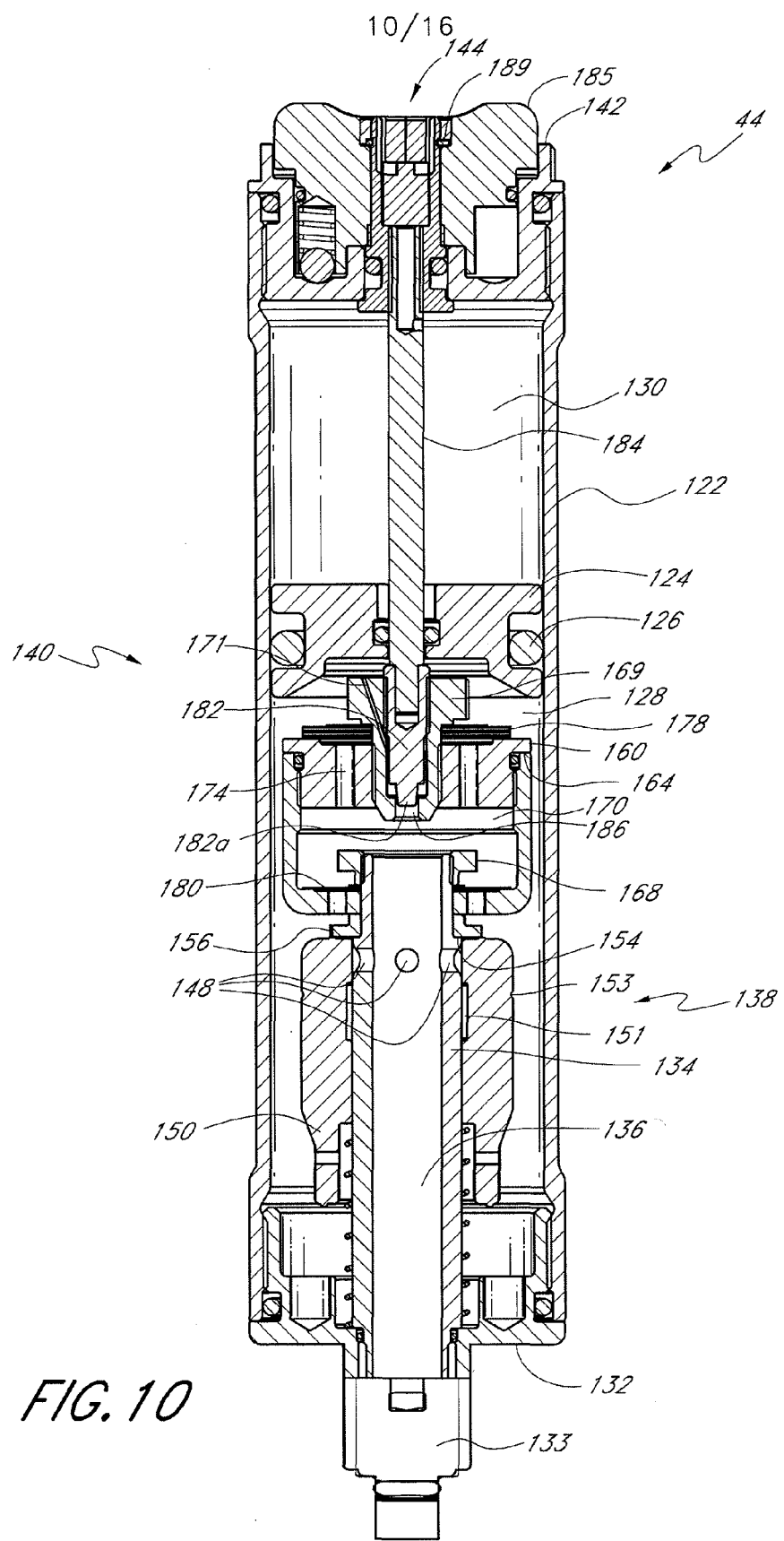
FIG. 10 is an enlarged cross-section of the reservoir of the shock absorber of FIG. 1 showing an inertia valve in a closed position.
Figure 11:
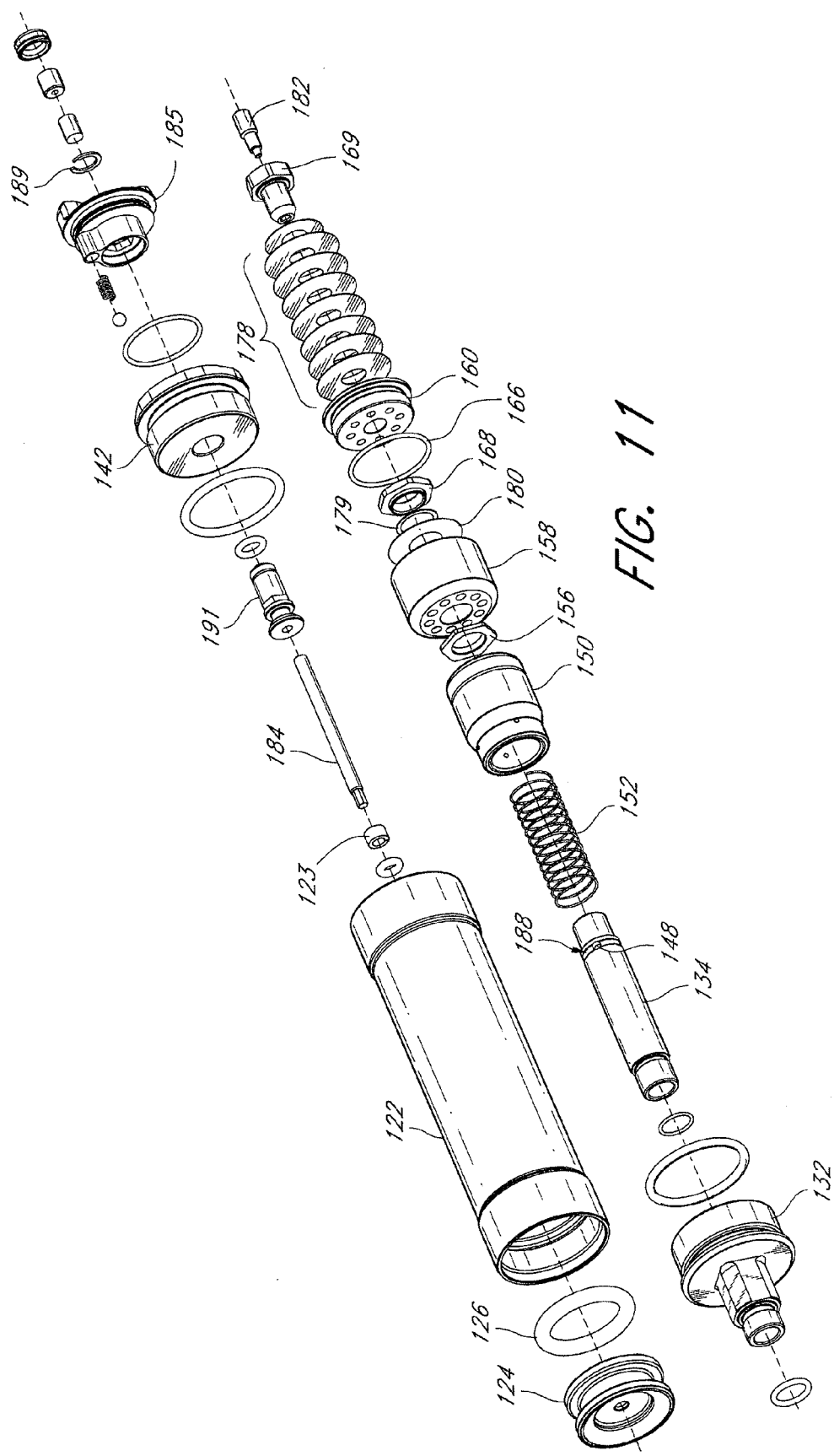
FIG. 11 is an exploded perspective view of the components of the reservoir of FIG. 1.

With reference to FIGS. 10 through 16, the components of the reservoir body portion 44 will now be described. FIG. 11 is an exploded perspective view of the components that comprise the reservoir body portion 44 of the rear shock 38. As most clearly shown in FIG. 10, the reservoir body portion 44 includes a reservoir tube 122. The reservoir tube 122 is closed on both ends thereof. A floating reservoir piston 124 is positioned inside of the reservoir tube 122 and is in sliding communication with an inside surface of the reservoir tube 122. A substantially fluid-tight seal between the interior surface of the reservoir tube 122 and the reservoir piston 124 is provided by the seal member 126. Although other suitable seals may also be used, the seal member 126 is preferably a substantially round cross-section, annular seal. A low friction bushing 123 helps align the reservoir piston 124 on a reservoir adjustment rod 184.

The interior space of the reservoir tube 122 is divided into a reservoir chamber 128 and a gas chamber 130 by the floating reservoir piston 124. An end cap 132 closes the reservoir chamber 128 portion of the reservoir tube. A connector 133 attached to the end cap 132 allows the reservoir body portion 44 to interface with the closed end portion 56 of the hydraulic fluid body portion 42 so that hydraulic fluid can flow from the passage 114 in the closed end portion 56 of the hydraulic fluid body portion 42 to the reservoir chamber 128 of the reservoir body portion 44. In this configuration, the passages 112 and 114 are in fluid communication with the central passage 136 of the reservoir shaft 134, as well as with the compression chamber 96.

Figure 15:
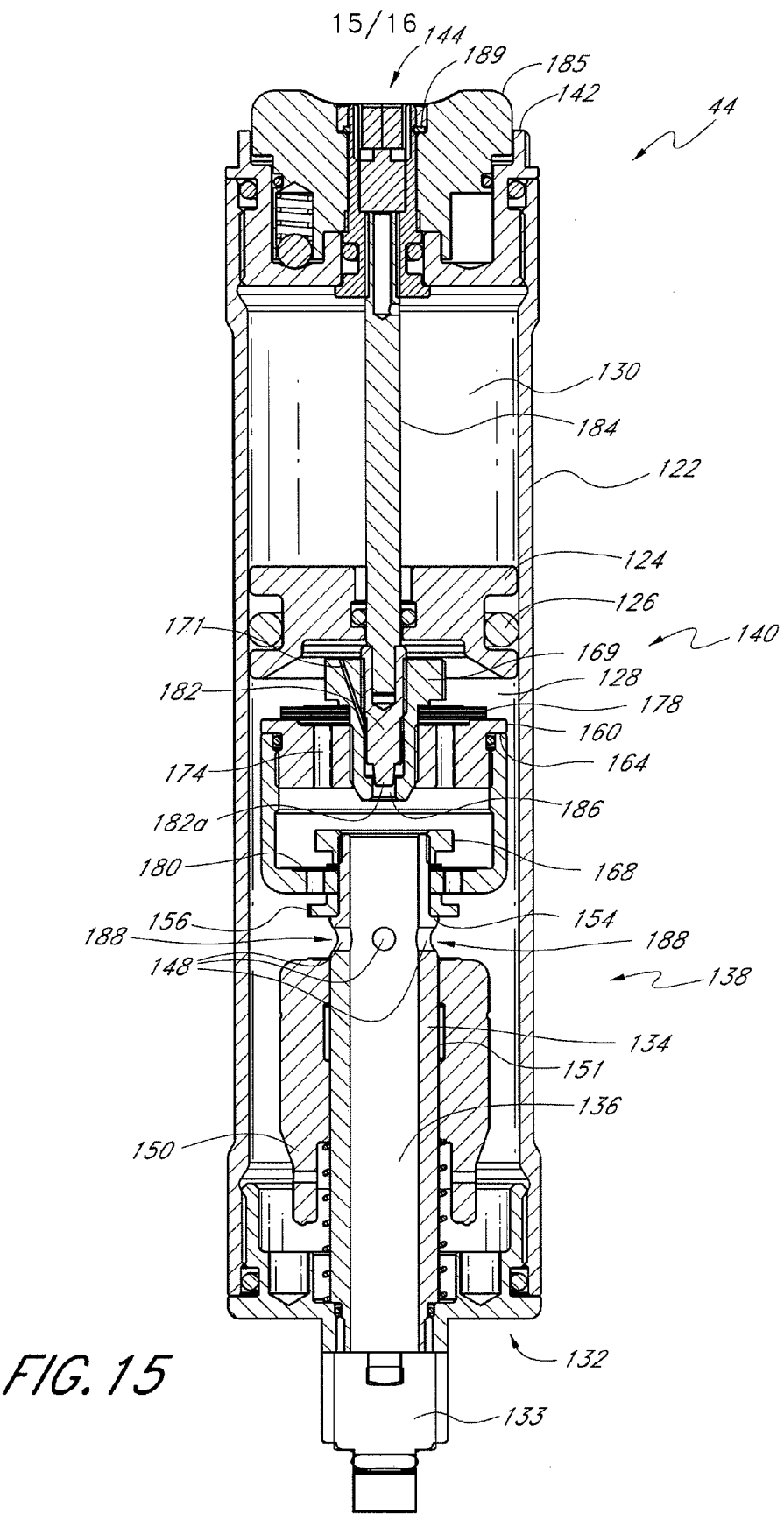
FIG. 15 is an enlarged cross-section of the reservoir of FIG. 1 showing the inertia valve being in an open position.
Figure 16:
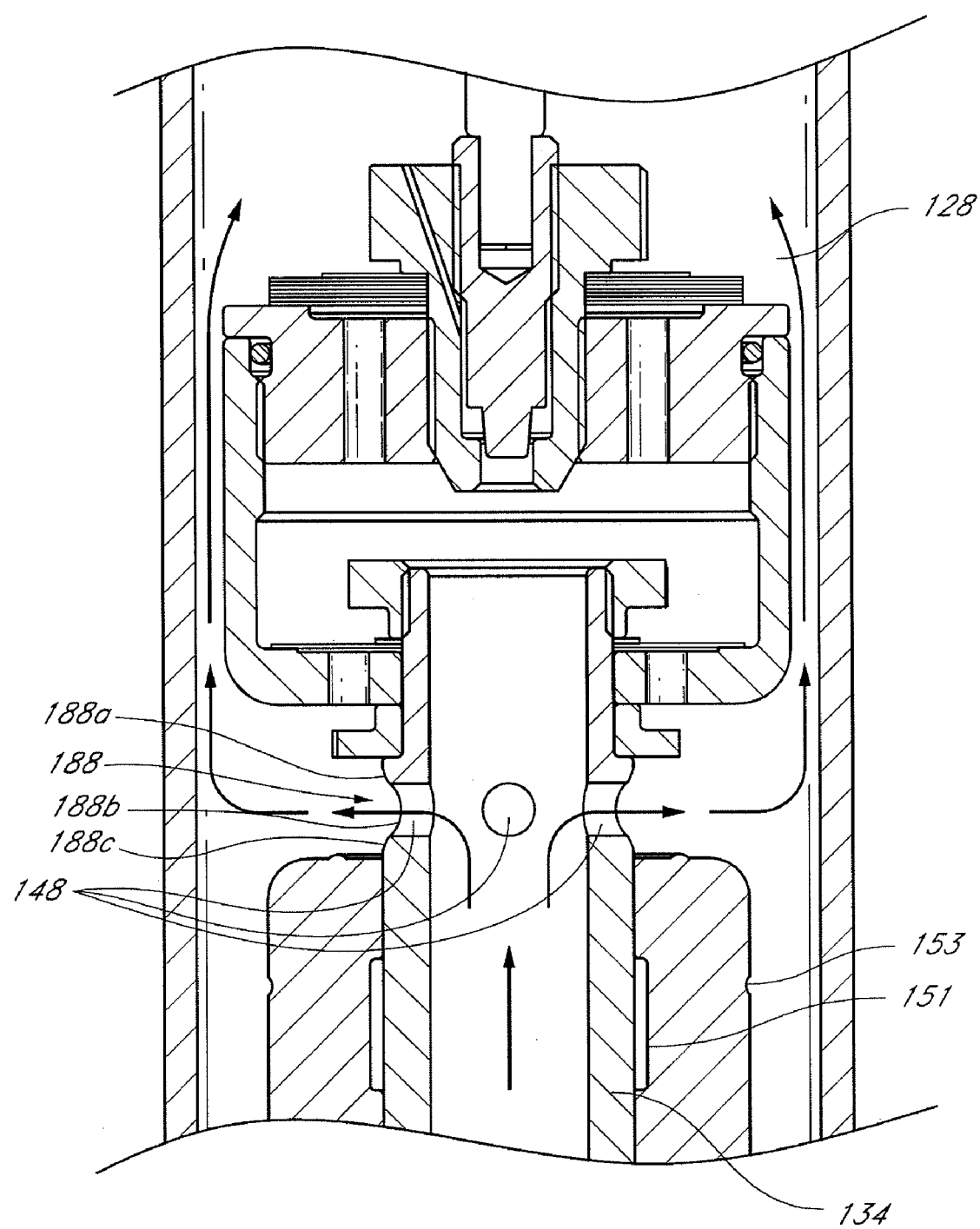
FIG. 16 is an enlarged cross-section of the reservoir of FIG. 1 showing the flow path of hydraulic fluid through the inertia valve during the compression motion of the rear shock, the inertia valve accordingly being in an open position.

An inertia valve assembly 138 is also supported by the reservoir shaft 134. When in the open configuration, as illustrated in FIGS. 15 and 16, the inertia valve assembly 138 permits communication between the reservoir chamber 128 and the compression chamber 96 via the passages 114 and 136. Stated another way, when the inertia valve assembly 138 is in the open configuration, hydraulic fluid is permitted to flow from the compression chamber 96 through the passage 114 and passage 136, and out through reservoir shaft fluid ports 148 into the reservoir chamber 128.

Cap 142 closes the gas chamber 130 end of the reservoir tube 122. The cap 142 includes a valve assembly 144 to add or remove gas, such as nitrogen, for example, to or from the gas chamber 130. The positive pressure exerted on the floating reservoir piston 124 by the pressurized gas within the gas chamber 130 causes the floating reservoir piston 124 to exert a pressure on the hydraulic fluid in the reservoir chamber 128. In this configuration, the positive pressure causes the gas chamber 130 to expand to include any space made available when hydraulic fluid flows from the reservoir chamber into the compression chamber. It also improves the flow of fluid from the reservoir body portion 44 into the into the compression chamber 96 during the rebound motion of the rear shock 38.

Referring to FIGS. 10 and 11, a primary valve assembly 140 is positioned above the inertia valve assembly 138 and is carried by the reservoir shaft 134. A shoulder portion 154 is defined where the reservoir shaft 134 reduces in diameter. The shoulder 154 supports an annular washer 156. The annular washer 156 supports the primary valve assembly 140. The washer 156 also provides a buffer between the inertia mass 150 and the primary valve assembly 140.

Figure 12:
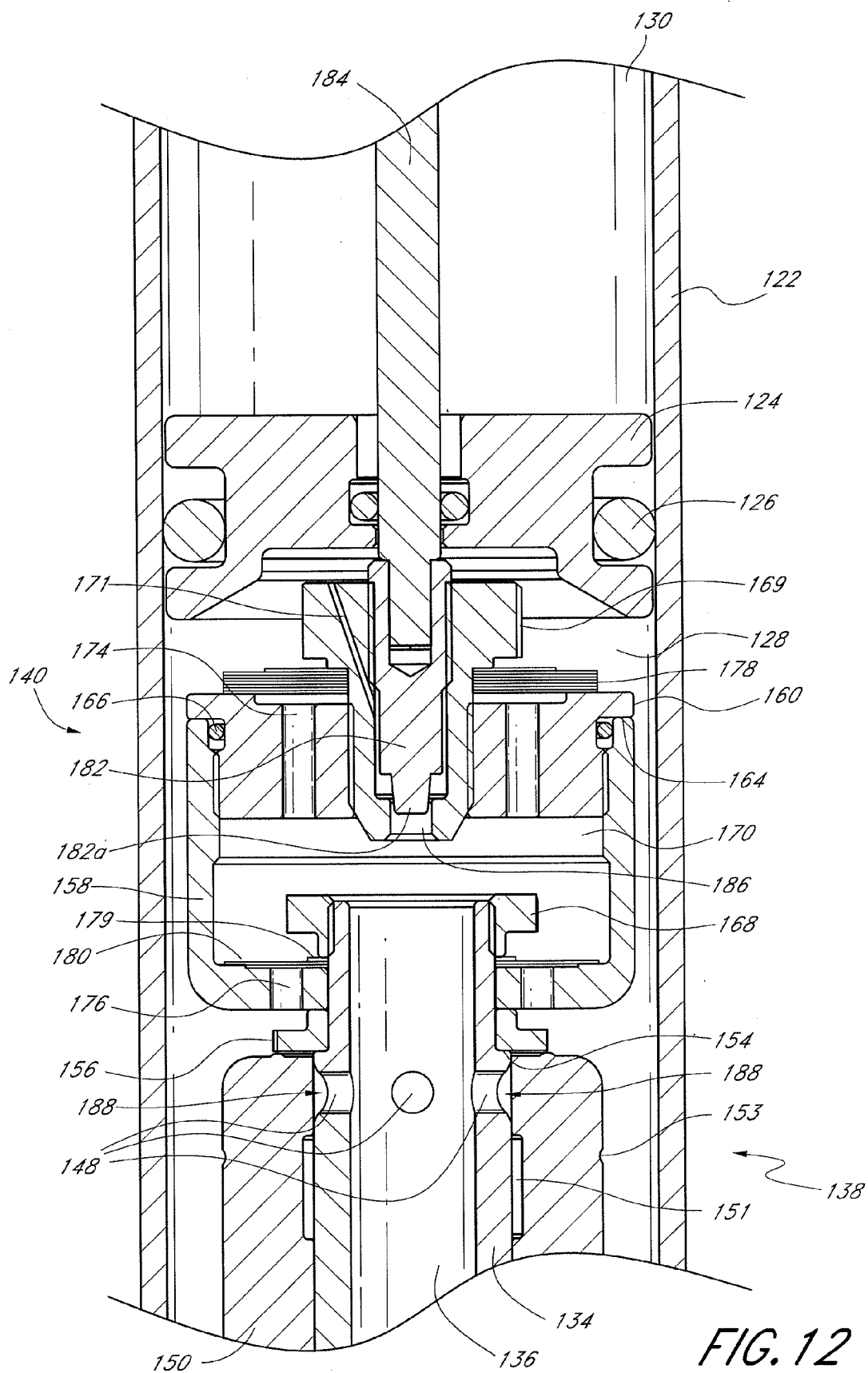
FIG. 12 is an enlarged cross-section of the reservoir of FIG. 1 showing the inertia valve being in a closed position.

As is clearly illustrated in FIG. 12, the primary valve assembly 140 is generally comprised of a cylindrical base 158 and a cap 160. The cap 160 is preferably threadably engaged with the base 158 and supported by an upper surface 164 of the base 158. A cap seal 166 seals the cap 160 to the inner surface of the base 158. The cap seal 166 is preferably an annular ring with a round cross-section, but the cap seal 166 can have any suitable configuration. The cap 160 is preferably threadably fastened to the base 158. The base 158 is attached to the reservoir shaft 134 by a threaded fastener 168. A primary valve chamber 170 is defined as the space between the cap 160 and the base 158. The reservoir shaft 134 partially extends into the primary valve chamber 170 and has an open end such that the passage 136 is in communication with the primary valve chamber 170.

The cap 160 has one or more axial compression flow passages 174. The base 158 has one or more axial refill ports 176. Because the axial refill passages are located in the base 158 and not in the cap 160 (where the compression flow passages 174 are located), the geometric configuration of the cap 160 is advantageously simplified. A further advantage of having the refill ports 176 in the base 158 as opposed to having them in the cap 160 along with the compression flow passages 174 is that the size of either the refill ports 176 or the compression flow passages 174 will not be constrained by the size limitations of the cap 160. A compression flow shim stack 178, which covers the compression flow passages 174, is located above the cap 160. A threaded fastener 169 secures the compression flow shim stack 178 in place. Once the threaded fastener 169 is threaded into the cap 160, it can be held in place with an adhesive or other suitable material to prevent it from loosening. As will be discussed below, the threaded fastener 169 also comprises a bleed valve port 171 which adjustably provides another flow path for hydraulic fluid to flow from the primary valve chamber 170 to the reservoir chamber 128. As discussed below, adjustment of the bleed valve port 171 adjusts the stiffness of the rear shock 38.

As stated above, the illustrated embodiment preferably comprises a compression flow shim stack 178 to regulate the flow rate of hydraulic fluid through the compression flow passages 174. In one embodiment, between 50 lbs and 75 lbs of force is required to be exerted on the compression flow shim stack 178 in order to deflect the compression flow shim stack 178 enough to allow the hydraulic fluid to flow through the compression flow passages 174 at a rate that allows the piston 68 to move within the hydraulic fluid body portion 42 at a rate of approximately 0.05 m/s. In another embodiment, between 25 lbs and 50 lbs of force is required to be exerted on the compression flow shim stack 178 in order to allow the piston 68 to move within the hydraulic fluid body portion 42 at a rate of approximately 0.05 m/s.

In certain embodiments, when there is 25 lbs, 35 lbs, 45 lbs, 55 lbs, 65 lbs or 75 lbs of force exerted on the compression flow shim stack 178, the shim stack 178 deflects thereby opening the damping valve. Specifically, the compression flow shim stack 178 deflects enough to allow the piston 68 to move within the hydraulic fluid body portion 42 at a rate of approximately 0.05 meters/sec.

However, to regulate the flow rate of hydraulic fluid through the compression flow passages 174, a flow element having a series of ports may be substituted for the shim stack 178. In general, any of the shim stacks described herein may be replaced or augmented with a flow element having a series of ports for the purpose of regulating the flow rate of hydraulic fluid through the various components comprising the rear shock 38.

The axial compression flow passages 174 may cumulatively perforate and, hence, allow the passage of hydraulic fluid through, 10% to 50%, or 25% to 35%, of the included surface area of the cap 160. The axial refill ports 176 may cumulatively perforate and, hence, allow the passage of hydraulic fluid through, 10% to 50% or more of the included surface area of the base 158. The axial refill ports 176 may cumulatively perforate and allow the passage of hydraulic fluid through 2% to 25% of the included surface area of the base 158. The axial refill ports 176 may cumulatively perforate and allow the passage of hydraulic fluid through the base 158 at a flow rate approximately equal to the amount of flow of hydraulic fluid that is flowing through passage 114, i.e., approximately equal to the amount of flow of hydraulic fluid that is flowing from the reservoir body portion 44 to the main body portion 39.

In one embodiment, the compression flow shim stack 178 is configured to deflect to allow, but damp the flow rate of, hydraulic fluid through the compression flow passages 174 at normal operating pressures of the rear shock 38. In certain embodiments, each of the shims comprising the compression flow shim stack 178 is preferably a bendable disc made from a metallic alloy. In one embodiment, five shims that are approximately 16 mm in diameter and 0.15 mm thick, stacked together, would produce a compression damping force of approximately 75-80 lbs at a rate of fluid flow that allows the piston 68 to move within the hydraulic fluid body portion 42 at a rate of approximately 0.05 m/s. In another embodiment, four shims that are approximately 16 mm in diameter and 0.15 mm thick, stacked together, would produce a compression damping force of approximately 65-70 lbs at a rate of fluid flow that allows the piston 68 to move within the hydraulic fluid body portion 42 at a rate of approximately 0.05 m/s.

In another embodiment, three shims that are approximately 16 mm in diameter and 0.15 mm thick, stacked together, would produce a compression damping force of approximately 55-60 lbs at a rate of fluid flow that allows the piston 68 to move within the hydraulic fluid body portion 42 at a rate of approximately 0.05 m/s. In another embodiment, two shims that are approximately 16 mm in diameter and 0.15 mm thick, stacked together, would produce a compression damping force of approximately 45-50 lbs at a rate of fluid flow that allows the piston 68 to move within the hydraulic fluid body portion 42 at a rate of approximately 0.05 m/s, and so on.

The compression flow shim stack 178 of the present invention operates to damp the compression motion of the rear shock 38 and, accordingly, can be configured to deflect to allow hydraulic fluid to flow through the compression flow passages 174 at low or regular operating pressures within the primary valve chamber 170. In one embodiment, approximately 90% or more of the compression motion damping of the rear shock is accomplished by the compression flow shim stack 178 located in the reservoir body portion 44, whereas the remainder of the compression motion damping of the rear shock is accomplished by other components of the rear shock (e.g., the compression shim stack 106 located in the main body portion 39). In another embodiment, approximately 80% or more of the compression motion damping of the rear shock is accomplished by the compression flow shim stack 178 located in the reservoir body portion 44. In yet another embodiment, approximately 70% or more of the compression motion damping of the rear shock is accomplished by the compression flow shim stack 178 located in the reservoir body portion 44. In yet another embodiment, approximately 50% or more of the compression motion damping of the rear shock is accomplished by the compression flow shim stack 178 located in the reservoir body portion 44.

As illustrated in FIGS. 10 and 12, a bleed valve plug 182 extends downwardly from below the reservoir piston 124, and threads into a cylindrical interior threaded surface of the threaded fastener 169. The reservoir adjustment rod 184 preferably inserts into the bleed valve plug 182 such that the bleed valve plug 182 is in rotational communication with the reservoir adjustment rod 184. On its other end, the reservoir adjustment rod 184 is preferably attached to a reservoir adjustment dial 185. The reservoir adjustment dial 185 is in communication with, but is free to rotate relative to, the cap 142. In particular, a clip 189 inserted into a circumferential groove in the valve post 191 holds the reservoir adjustment dial 185 in communication with the cap 142. A ball detent mechanism 187 provides distinct adjustment positions of the reservoir adjustment dial 185.

Further, the bleed valve plug 182 defines a tip 182a that preferably adjustably regulates the flow of hydraulic fluid through a metering rod flow port 186 located in the end of the threaded fastener 169. The tip 182a preferably defines a conically shaped surface that tapers to a smaller cross-sectional diameter toward the bottom end of the tip 182a. The largest diameter of the conical portion is greater than the diameter of the cylindrical metering rod flow port 186, and the smallest diameter of the conical portion is smaller than the diameter of the cylindrical metering rod flow port 186. In this configuration, the flow of hydraulic oil through the metering rod flow port 186 can be reduced by engaging the tip 182a of the bleed valve plug 182 into the metering rod flow port 186. Accordingly, the flow of hydraulic oil through the metering rod flow port 186 can be substantially prevented by fully engaging the tip 182a of the bleed valve plug 182 into the metering rod flow port 186. However, some amount of flow may occur through a clearance space between the tip 182a and the metering rod flow port 186, which may occur due to normal manufacturing variations.

As most clearly illustrated in FIG. 12, in this configuration, as the reservoir adjustment dial 185 is turned either clockwise or counter-clockwise, the axial position of the bleed valve plug 182 is preferably moved either up or down relative to the threaded fastener 169, respectively, within the interior threaded surface of the threaded fastener 169. As the bleed valve plug 182 is moved down relative to the threaded fastener 169, the bleed valve plug 182 progressively blocks the bleed valve port 171 and metering rod flow port 186, though not necessarily simultaneously. Thus, as the bleed valve plug 182 is rotated further into the threaded fastener 169, the flow of hydraulic fluid through the bleed valve port 171 is substantially cut off. Because the bleed valve port 171 provides another, albeit more constricted, flow path for hydraulic fluid to flow from the primary valve chamber 170 into the reservoir chamber 128, cutting off the flow of hydraulic fluid through the bleed valve port 171 effectively makes the rear shock 38 stiffer during the compression motion of the rear shock 38.

In the illustrated embodiment, a single shim comprising the rebound flow shim stack 180 is preferably located between an annular ring 179 and the base 158. However, the rebound flow shim stack 180 is not so limited. The rebound flow shim stack 180 can be comprised of multiple shims, similar to the compression flow shim stack 178 described above, and the reservoir body portion 44 may or may not have the annular ring 179. The rebound flow shim stack 180 covers the refill ports 176. The rebound flow shim stack 180 substantially prevents fluid from flowing from the primary valve chamber 170 to the reservoir chamber 128 through refill ports 176, while not significantly affecting the rate of fluid flow from the reservoir chamber 128 into the primary valve chamber 170. I.e., the rebound flow shim stack 180 prevents hydraulic fluid flow through refill ports 176 during the compression motion of the rear shock 38, but does not substantially affect the flow rate of hydraulic fluid through the refill ports 176 during the rebound motion of the rear shock 38.

In the illustrated embodiment, the damping control of the rebound motion of the rear shock 38 is advantageously located in the main shock body of the rear shock 38, as opposed to being located in the reservoir body portion 44 as in other, conventional designs. Because the flow restriction, or damping, is located in the main shock body of the rear shock 38, the flow of hydraulic fluid into the compression chamber 96 is not disturbed by cavitation or other flow disrupting effects that often result when the hydraulic fluid is sucked or pulled through the flow restriction devices or shim stacks that are located in the reservoirs of other, conventional designs. In the illustrated embodiment, during the rebound motion of the rear shock, a compressive force pushes the hydraulic fluid located in the rebound chamber 98 through the rebound flow passages 108, thus avoiding cavitation and other flow efficiency effects that may otherwise result.

In certain embodiments, at least 90%, at least 80%, at least 70%, at least 60% or at least 50% of the rebound motion damping of the rear shock 38 is accomplished in the main body portion 39, whereas the remainder of the rebound damping of the rear shock is accomplished by other components of the rear shock (preferably in the reservoir body portion 44). In one embodiment, this rebound damping in the main body portion 39 can be substantially accomplished by the rebound shim stack 110 located in the main body portion 39.

Figure 14:
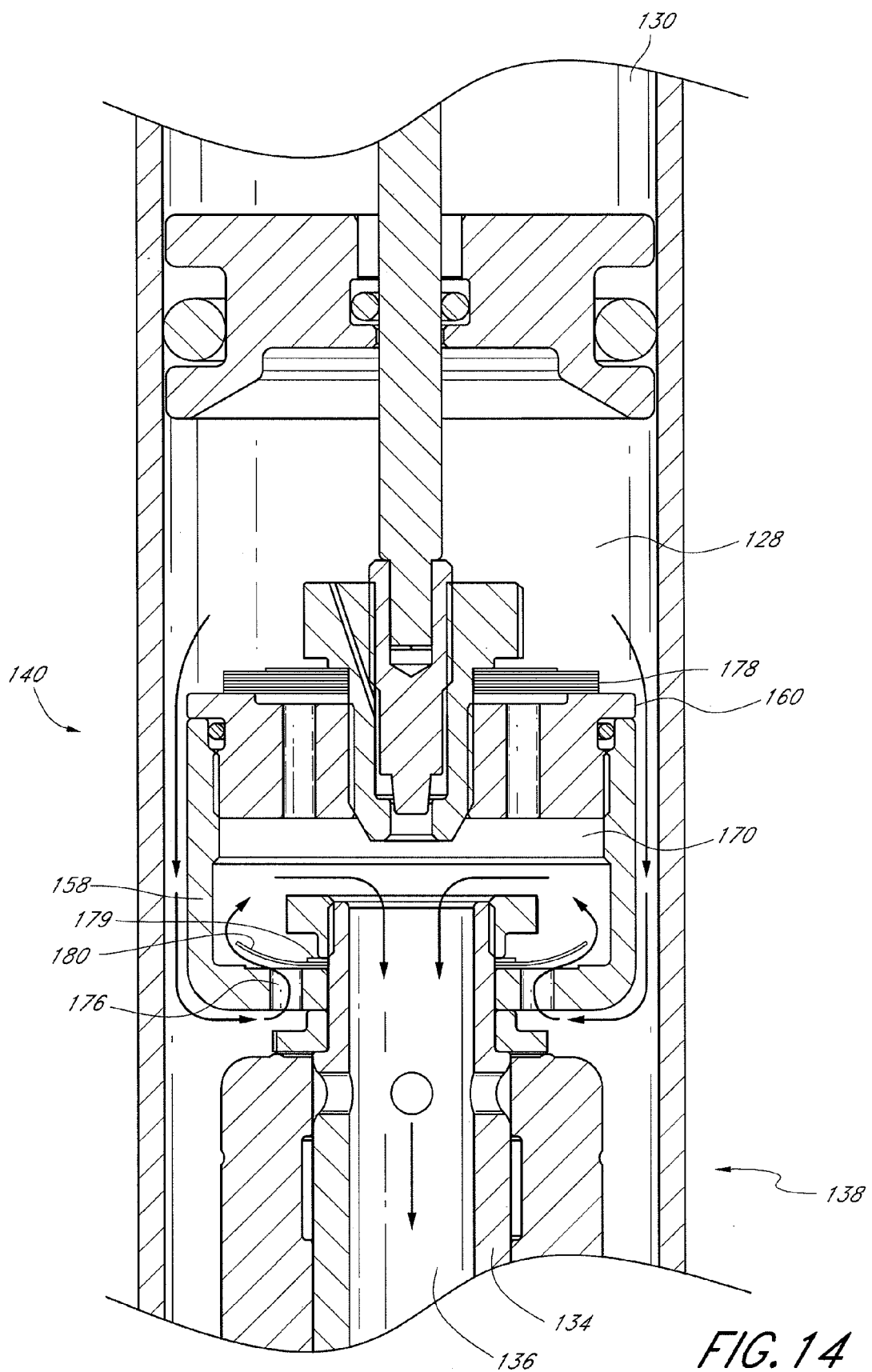
FIG. 14 is an enlarged cross-section of the reservoir of FIG. 1 showing the flow path of hydraulic fluid through the primary valve during the rebound motion of the rear shock, the inertia valve being in a closed position.

FIG. 14 illustrates the flow of hydraulic fluid from the reservoir chamber 128, around the cap 160 and the base 158 and through the rebound flow passages 176 and into the passage 136, as well as the corresponding preferred deflection of the rebound flow shim stack 180, when the inertia valve 138 is in the closed position.

As most clearly illustrated in FIG. 16, a plurality of radially extending reservoir shaft fluid ports 148, each having a generally cylindrical geometry, extend through the reservoir shaft 134. The reservoir shaft fluid ports 148 connect the passage 136 to the reservoir chamber 128. As mentioned above, the inertia valve assembly 138 also includes an inertia mass 150 that is disposed in an upward position by a spring 152, as is shown in FIGS. 10 and 12-14.

The diameter of each reservoir shaft fluid port 148 may be between 0.5 mm and 5.0 mm. As illustrated, the reservoir shaft 134 preferably has a total of four equally spaced reservoir shaft fluid ports 148, each with a diameter equal to approximately 1.0 mm. In another embodiment, the diameter of each reservoir shaft fluid port 148 is approximately 1.5 mm or more. In another embodiment, the diameter of each reservoir shaft fluid port 148 is approximately 2.0 mm or more. In another embodiment, the diameter of each reservoir shaft fluid port 148 is approximately 3.0 mm or more. In yet another embodiment, the diameter of each reservoir shaft fluid port 148 is approximately 4.0 mm or more. In another embodiment, the diameter of each reservoir shaft fluid port 148 is approximately 5.0 mm or more. In another embodiment, the reservoir shaft 134 may have six or more reservoir shaft fluid ports 148, regardless of the diameter of the reservoir shaft fluid ports 148. In certain embodiments, the total cross-sectional area of the reservoir shaft fluid ports 148 is 2 square millimeters to 100 square millimeters, 2 square millimeters to 80 square millimeters, 2 square millimeters to 60 square millimeters, 2 square millimeters to 40 square millimeters, 2 square millimeters to 20 square millimeters, 2 square millimeters to 10 square millimeters, or 2 square millimeters to 5 square millimeters. In certain embodiments, the total cross-sectional area of the reservoir shaft fluid ports 148 is no more than 12 square millimeters, no more than 10 square millimeters, no more than 8 square millimeters, no more than 6 square millimeters, or no more than 5 square millimeters.

Furthermore, in one embodiment, when the rear shock 38 encounters a bump that causes the piston 68 to move within the hydraulic fluid body portion 42 at a rate of approximately 1.0 m/s, the components comprising the inertia valve 138 will preferably be configured such that virtually all of the hydraulic fluid flows into the reservoir chamber 128 via the reservoir shaft fluid ports 148 and, accordingly, such that only a small volume of hydraulic fluid flows through the compression flow passages 174 at that rate of piston 68 movement. However, the inertia valve 138 of that same embodiment will preferably be configured such that, when the rear shock 38 encounters a more severe bump that causes the piston 68 to move within the hydraulic fluid body portion 42 at a rate of approximately 4.0 m/s, the components comprising the inertia valve 138 will preferably be configured such that approximately 20% or more of the total flow of hydraulic fluid flowing into the reservoir chamber 128 will flow through the reservoir shaft fluid ports 148 and approximately 80% or less of the total flow of hydraulic fluid flowing into the reservoir chamber 128 will flow through the compression flow passages 174.

In certain embodiments, when the rear shock 38 encounters a more severe bump that causes the piston 68 to move at a rate of approximately 4.0 m/s, the components comprising the inertia valve 138 will preferably be configured such that at least 80%, at least 70%, at least 60%, at least 50%, at least 40%, or at least 35% of the total flow of hydraulic fluid flowing into the reservoir chamber 128 will flow through passages other than passages closable by the inertia mass 150

(in the illustrated embodiment, the compression flow passages 174 and the bleed valve port 171).

In certain embodiments, the inertia valve 138 will preferably be configured such that, when the rear shock 38 encounters a more severe bump that causes the piston 68 to move at a rate of approximately 4.0 m/s, the components comprising the inertia valve 138 will preferably be configured such that no more than 10%, no more than 20%, no more than 30%, no more than 40%, no more than 50% or no more than 60% of the total flow of hydraulic fluid flowing into the reservoir chamber 128 will flow through the passages closable by the inertia mass (in the illustrated embodiment, the reservoir shaft fluid ports 148).

The inertia mass 150 is preferably made from brass and preferably has a mass less than approximately two ounces. In another embodiment, the inertia mass 150 preferably has a mass less than approximately one and one-half ounces. In another embodiment, the inertia mass 150 has a weight of approximately 32 grams, or 1.13 ounces. In another embodiment, the inertia mass 150 preferably has a mass less than approximately one ounce. In yet another embodiment, the inertia mass 150 preferably has a mass less than or equal to approximately one-half ounce. The inertia mass 150 preferably is free of any axial passages or other sophisticated internal features or contours other than the main, cylindrical passage through the longitudinal center of the inertia mass 150, and also the annular groove 151 on the inside surface of the inertia mass 150. Without such passages and sophisticated internal features and contours, the inertia mass 150 is advantageously easier to manufacture, does not require substantial deburring on the internal surfaces, and is less likely to bind or stick to the reservoir shaft 134 as compared to other, conventional designs. Preferably, the inertia mass 150 has a streamlined geometric configuration such that the mass to fluid resistance ratio is increased. The annular groove 151 is preferably formed on the inside surface of the inertia mass 150 to limit the amount of surface area on the inside surface of the inertia mass 150 that may come into contact with the outer surface of the reservoir shaft 134 and, hence, limit the amount of drag between the two components. The inertia mass 150 may also have an annular groove 153 around the exterior of the inertia mass 150.

Figure 13:
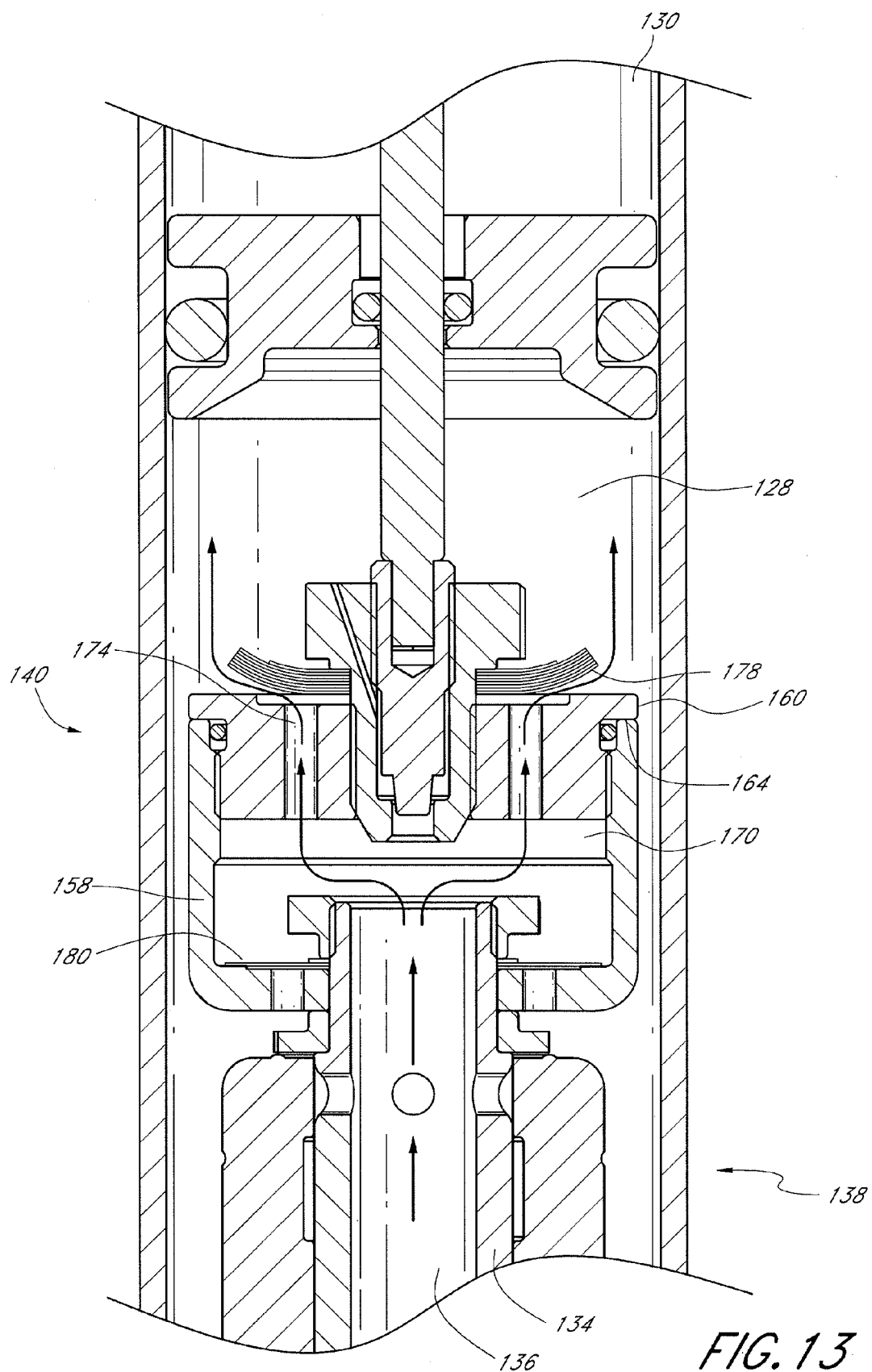
FIG. 13 is an enlarged cross-section of the reservoir of FIG. 1 showing the flow path of hydraulic fluid through the primary valve during the compression motion of the rear shock, the inertia valve being in a closed position.

As mentioned above, the spring 152 biases the inertia mass 150 into an upward, or closed, position wherein the inertia mass 150 covers the openings of the reservoir shaft fluid ports 148 to substantially prevent fluid flow from the passage 136 to the reservoir chamber 128. Preferably, when the inertia mass 150 is in a closed (upward) position, flow to the reservoir chamber 128 primarily occurs through the compression flow passages 174 in the cap 160. FIG. 13 illustrates the flow of hydraulic fluid from the passage 136 through the compression flow passages 174 in the cap 160 and into the reservoir chamber 128, as well as the corresponding preferred deflection of the compression flow shim stack 178, when the inertia valve 138 is in the closed position. However, the flow path, but not necessarily the flow volume, of hydraulic fluid through the compression flow passages 174 in the cap 160 and into the reservoir chamber 128 may be as illustrated in FIG. 13 even if the inertia valve 138 were in an open position.

The inertia mass 150 is also movable into a downward, or open, position against the biasing force of the spring 152. In the open position, which is illustrated in FIGS. 15 and 16, the inertia mass 150 uncovers at least some of the reservoir shaft fluid ports 148 to allow fluid to flow therethrough, and a reduced compression damping rate is achieved. As illustrated in FIG. 10, the end cap 132 preferably operates as the lowermost stop surface for the inertia mass 150. FIG. 16 illustrates the flow of hydraulic fluid through the inertia valve 138 during the compression motion of the rear shock 38 while the inertia mass 150 is in the open position. In this configuration, hydraulic fluid flows from the passage 136 through the reservoir shaft fluid ports 148, around the base 158 and cap 160 and into the reservoir chamber 128. Note that, while the inertia mass 150 is in the open position, hydraulic fluid may still flow from the passage 136 through the compression flow passages 174 in the cap 160 and into the reservoir chamber 128, as illustrated in FIG. 13, in addition to flowing through inertia valve.

It is noted that, while the inertia mass 150 may be described as having an open and a closed position, the inertia mass 150 likely does not completely prevent flow through the reservoir shaft fluid ports 148 in the closed position. That is, a fluid-tight seal is not typically created between the inertia mass 150 and the reservoir shaft 134 on which it slides. Thus, some fluid may flow through the inertia valve 138 in its closed position. Such fluid flow is often referred to as "bleed flow" and, preferably, is limited to a relatively small flow rate. To create a fluid-tight seal between the inertia mass 150 and the reservoir shaft 134 would require precise dimensional tolerances, which would be expensive to manufacture, and may also inhibit movement of the inertia mass 150 on the reservoir shaft 134 in response to relatively small acceleration forces.

With reference to FIGS. 12-16, another advantageous feature of the illustrated inertia valve 138 is a circumferential groove 188 around the exterior of the reservoir shaft 134. The center plane of the groove 188 preferably aligns with the axial centerlines of each of the reservoir shaft fluid ports 148. The groove 188 functions as a flow accumulator, equalizing the pressure of the hydraulic fluid emanating from the reservoir shaft fluid ports 148.

As most clearly illustrated in FIG. 16, the groove 188 preferably comprises an upper chamfer portion 188a, an arcuate portion 188b, and a lower chamfer portion 188c. The width of the groove 188 (i.e., the combined width of the upper chamfer portion 188a, the arcuate portion 188b, and the lower chamfer portion 188c) is preferably greater than the diameter of each of the reservoir shaft fluid ports 148 such the groove 188 extends both above and below each of the reservoir shaft fluid ports 148 and such that a significant amount of fluid can accumulate in the groove 188. In another embodiment, the groove 188 could be smaller than the diameter of the ports 148. The groove 188 allows the fluid pressure to be distributed evenly over the inner circumference of the inertia mass 150. The even distribution of fluid pressure preferably creates a force tending to center the inertia mass 150 around the reservoir shaft 134, thus partially or fully compensating for any inconsistencies in fluid pressure that would otherwise occur due to the locations or orientations of, or variations in size between, the reservoir shaft fluid ports 148. Such a feature helps to prevent binding of the inertia mass 150 on the reservoir shaft 134. The prevention of binding of the inertia mass 150 on the reservoir shaft 134 is beneficial in a bicycle application because it is desirable that the inertia valve be very sensitive to any terrain features which may only transmit relatively small acceleration forces to the inertia valve 138.

The preferred configuration of the groove 188 illustrated in FIG. 16 provides a nearly uniform (i.e., simultaneous) cutoff of hydraulic fluid flow emanating from each of the reservoir shaft fluid ports 148 as the inertia mass 150 reverts to its closed position. This is beneficial to ensuring that the inertia mass is not pushed off-center by the reservoir shaft fluid ports 148. As discussed, the preferred configuration of the groove 188 also advantageously ensures that the inertia mass 150 is not pushed off-center by a non-uniform flow of hydraulic fluid through the reservoir shaft fluid ports 148, or by non-uniform forces exerted by the hydraulic fluid flowing through the reservoir shaft fluid ports 148, during the compression motion of the rear shock 38.

Additionally, the chamfers 188a advantageously provide for a progressive shut off of hydraulic fluid flow through the reservoir shaft fluid ports 148 as the inertia mass 150 reverts to its closed position. In particular, as the acceleration causing the inertia mass 150 to move downward relative to the reservoir shaft fluid ports 148 is reduced, causing the inertia mass 150 to move upward, the inertia mass 150 first blocks the flow of hydraulic fluid flowing away from the lower chamfer portion 188c, thus blocking only a portion of the hydraulic fluid flow going through the reservoir shaft fluid ports 148 in this position. The hydraulic fluid flowing from the lowest portion of the lower chamfer portion 188c is less than the hydraulic fluid flowing from the upper portion of the lower chamfer portion 188c. Thus, as the hydraulic mass 150 continues to move upward, it progressively blocks a greater amount of the hydraulic fluid flowing away from the lower chamfer portion 188c. As the hydraulic mass 150 continues to move upward, it progressively blocks a greater portion of the arcuate portion 188b and, finally, the upper chamfer portion 188a, until substantially all of the hydraulic fluid flowing through the reservoir shaft fluid ports 148 is stopped.

Although the illustrated reservoir body portion 44 includes an inertia valve 138, in other arrangements, the inertia valve 138 may be omitted or may be replaced with, or supplemented with, other compression or rebound fluid flow valves. However, the inertia valve 138 is preferred because it operates to distinguish terrain-induced forces from rider-induced forces. Terrain-induced forces are generally upwardly directed (compression) forces caused by the vehicle (such as a bicycle) encountering a bump. Rider-induced forces, in the case of a bicycle application, typically are short duration, relatively large amplitude forces generated from the pedaling action of the rider. The inertia valve may alternatively be configured to operate in response to rebound forces, rather than compression forces.

The operation of the rear shock 38 is now discussed in detail, with reference to FIGS. 1-16. As discussed above, the rear shock 38 is preferably mounted between the seat post tube 25 and the subframe portion 26 of the bicycle 20. Preferably, the hydraulic fluid body portion 42 portion of the rear shock 38 is connected to the subframe portion 26 and the air tube 40 is connected to the seat post tube 25. As shown in FIG. 1, the reservoir body portion 44 is preferably connected to the subframe portion 26 of the bicycle 20 near the rear axle. The rear shock 38 is capable of both compression and rebound motion.

When the rear wheel 30 of the bicycle 20 is impacted by a bump, the subframe portion 26 rotates with respect to the main frame portion 24, tending to compress the rear shock 38. The inertia mass 150 is biased by the force of the spring 152 to remain in the closed position. The closed position of the inertia valve 138 is illustrated in FIGS. 10, and 12-14. In order for the inertia mass 150 to overcome the force of the spring 152 and move to an open position such that fluid flows from the passage 136 through the reservoir shaft fluid ports 148 and into the reservoir chamber 128, the inertia mass 150 must be in an open position. The open position of the inertia mass 150 is shown in FIGS. 15 and 16. The inertia mass 150 translates to the open position if the acceleration experienced by the reservoir body portion 44 along its longitudinal axis exceeds a predetermined threshold value.

For compression motion of the rear shock 38 (i.e., for the piston member 68 to move into the hydraulic fluid body portion 42), the fluid that is displaced from the shock shaft 70 must flow into the reservoir chamber 128. However, when the inertia mass 150 is in a closed position with respect to the reservoir shaft fluid ports 148, fluid flow into the reservoir chamber 128 is preferably substantially impeded. When the inertia valve 138 is in the closed position, the rear shock 38 preferably remains substantially rigid.

However, even if the inertia valve 138 remains in the closed position, fluid can still transfer from the compression chamber 96 into the reservoir chamber 128 if the compressive force exerted on the rear shock 38 is of a magnitude sufficient to increase the fluid pressure within the primary valve chamber 170 to an amount that will cause the compression flow shim stack 178 to open and allow fluid to flow from the primary valve chamber 170 through the compression flow passages 174 and into the reservoir chamber 128.

In the configurations described herein, the spring force of the rear shock 38 is produced by the pressure of the gas in the primary air chamber 86. The damping rate in compression is determined mainly by the flow through the compression flow passages 174 in the reservoir body portion 44, as well as the less significant damping effects produced by the compression shim stack 106 in the main body portion 39.

If a sufficient magnitude of acceleration is imposed along the longitudinal axis of the reservoir body portion 44 (i.e., the axis of travel of the inertia mass 150), the inertia mass 150 will overcome the biasing force of the spring 152 and move downward relative to the reservoir shaft 134 into an open position. The open position of the inertia mass is illustrated in FIGS. 15 and 16. With the inertia valve 138 in the open position, hydraulic fluid is able to be displaced from the compression chamber 96 through the passages 112, 114 and the shaft passage 136, through the reservoir shaft fluid ports 148 and into the reservoir chamber 128. Thus, the rear shock 38 is able to be compressed and the compression damping is preferably determined primarily by flow through the compression flow passages 174 in the reservoir body portion 44 as well as the reservoir shaft fluid ports 148.

The mass of the inertia mass 150, the spring rate of the spring 152, and the preload on the spring 152 determine the minimum threshold for the inertia mass 150 to overcome the biasing force of the spring 152 and move to the open position. The spring rate of the spring 152 and the preload on the spring 152 are preferably selected such that the inertia mass 150 is biased by the spring 152 into a closed position when no upward acceleration is imparted in the axial direction of the reservoir body portion 44. However, the inertia mass 150 will preferably overcome the biasing force of the spring 152 when subject to an acceleration that is between 0.1 and 3 times the force of gravity (G's). Preferably, the inertia mass 150 will overcome the biasing force of the spring 152 upon experiencing an acceleration that is between 0.25 and 1.5 G's. However, the predetermined threshold may be varied from the values recited above.

With reference to FIGS. 15 and 16, when the inertia mass 150 is in the open position, the spring 152 exerts a biasing force on the inertia mass 150 which tends to move the inertia mass 150 toward the closed position. Advantageously, with the exception of the spring biasing force and fluid resistance, the inertia mass 150 moves freely within the body of fluid contained in the reservoir chamber 128 to increase the responsiveness of the inertia valve 138 and, hence, the rear shock 38 to forces exerted on the rear wheel 30. The inertia valve 138 differentiates between bumpy surface conditions and smooth surface conditions, and alters the damping rate accordingly. During smooth surface conditions, the inertia valve 138 remains in a closed position and the damping rate is desirably firm, thereby inhibiting suspension motion due to the movement of the rider of the bicycle 20. When the first significant bump is encountered, the inertia valve 138 opens to advantageously lower the damping rate so that the bump may be absorbed by the rear shock 38.

Once the rear shock 38 has been compressed, either by fluid flow through the primary valve assembly 140 or the inertia valve 138, the spring force generated by the combination of the primary air chamber 86 and the second air chamber 88 tend to bias the hydraulic fluid body portion 42 away from the air tube 40. In order for the rear shock 38 to rebound, a volume of fluid equal to the displaced volume of the shock shaft 70 must be drawn from the reservoir chamber 128 and into the compression chamber 96. Fluid flow is allowed in this direction through the refill ports 176 in the primary valve assembly 140 against a desirably light resistance offered by the rebound flow shim stack 180. Gas pressure within the gas chamber 130 exerting a force on the floating reservoir piston 124 may assist in this refill flow. Thus, the rebound damping rate is determined primarily by fluid flow through the rebound flow passages 108 against the biasing force of the rebound shim stack 110.

As discussed, the present rear shock 38 includes an inertia valve 138 comprising an inertia mass 150 and a reservoir shaft 134 having a circumferential groove 188 in the reservoir shaft 134 aligned with the reservoir shaft fluid ports 148 to create an even distribution of fluid pressure on the inertia mass 150 and, hence, prevent the inertia mass 150 from binding on the reservoir shaft 134. The off-center condition of the inertia mass 150 may cause it to contact the reservoir shaft 134 causing friction, which tends to impede motion of the inertia mass 150 on the reservoir shaft 134. Due to the relatively small mass of the inertia mass 150 and the desirability of having the inertia mass 150 respond to small accelerations, any friction between the inertia mass 150 and the reservoir shaft 134 seriously impairs the performance of the inertia valve 138 and may render it entirely inoperable. The off-center condition may result from typical errors associated with the manufacturing processes needed to produce the components of the inertia valve 138. Further, the binding effect of the inertia mass 150 may result from burrs located on the inner surface of the inertia mass 150 or the outer surface of the reservoir shaft 134. Because the inertia mass 150 advantageously has a generally smooth inner surface, the deburring operations on the inside surface of the inertia mass 150 are substantially simplified and the risk of binding is substantially reduced.

As the accompanying figures show, the rear shock 38 has other features and components such as seals which will are shown but not described herein that are obvious to one of ordinary skill in the art. Accordingly, a discussion of these features has been omitted.

Although the present invention has been explained in the context of several preferred embodiments, minor modifications and rearrangements of the illustrated embodiments may be made without departing from the scope of the invention. For example, but without limitation, although the preferred embodiments described the bicycle damper for altering the rate of compression damping, the principles taught may also be utilized in damper embodiments for altering rebound damping, or for responding to lateral acceleration forces, rather than vertical acceleration forces. In addition, although the preferred embodiments were described in the context of an off-road bicycle application, the present damper may be modified for use in a variety of vehicles, or in non-vehicular applications where dampers may be utilized. Furthermore, the pressure and flow equalization features of the inertia valve components may be applied to other types of valves, which may be actuated by acceleration forces or by means other than acceleration forces. Accordingly, the scope of the present invention is to be defined only by the appended claims.

What is claimed is:

1. A damper for a bicycle, comprising:
    a primary unit comprising a damper tube;
    a piston rod that supports a main piston, wherein said main piston is movable within said damper tube of said primary unit, said main piston and said damper tube at least partially defining a compression chamber and a rebound chamber;
    a reservoir tube that is outside of compression chamber of said primary unit, the reservoir tube comprising a reservoir fluid chamber;
    an inertia valve within said reservoir tube;
    a flow path connecting said reservoir fluid chamber and said compression chamber of said primary unit; and
    wherein at a piston speed of 4 meters/second at least 40% of compression damping in said reservoir tube occurs in a circuit which is not closable by said inertia valve.

2. The damper of claim 1, wherein at a piston speed of 4 meters/second at least 50% of compression damping in said reservoir tube occurs in a circuit which is not closable by said inertia valve.

3. The damper of claim 1, wherein at a piston speed of 4 meters/second at least 60% of compression damping in said reservoir tube occurs in a circuit which is not closable by said inertia valve.

4. The damper of claim 1, wherein at a piston speed of 4 meters/second at least 70% of compression damping in said reservoir tube occurs in a circuit which is not closable by said inertia valve.

5. The damper of claim 1, wherein at a piston speed of 4 meters/second at least 80% of compression damping in said reservoir tube occurs in a circuit which is not closable by said inertia valve.

6. The damper of claim 1, wherein most compression damping occurs in said reservoir tube.

7. The damper of claim 1, wherein said primary unit further comprises a spring chamber.

8. The damper of claim 7, further comprising a spring piston fixed with respect to said compression chamber, wherein said spring piston moves within said spring chamber.

9. The damper of claim 7, said inertia valve being responsive to terrain-induced forces and not responsive to rider-induced forces when said damper is assembled to the bicycle.

10. The damper of claim 9, said inertia valve having an open position and a closed position, wherein said inertia valve permits a flow of said fluid from said compression chamber of said primary unit to said reservoir fluid chamber of said reservoir tube when said inertia valve is open and the flow through said inertia valve is reduced when said inertia valve is in said closed position and wherein said circuit provides damping when said inertia valve is in an open position.

11. The damper of claim 10, wherein said damper exhibits a soft damping rate when said inertia valve is open and a stiff damping rate when said inertia valve is closed.

\* \* \* \* \*